US012778351B2

(12) United States Patent
Lathouwers et al.

(10) Patent No.: US 12,778,351 B2
(45) Date of Patent: Nov. 3, 2026

(54) FOAMED PRODUCT DISPENSING SYSTEM, PRODUCT CONTAINER, AND PRODUCT DISPENSING MACHINE

(71) Applicant: FrieslandCampina Nederland B.V., Amersfoort (NL)

(72) Inventors: Petrus Martinus Lathouwers, Wageningen (NL); Ericus Johannes Maria Marrée, Wageningen (NL); Samuel Van Den Driessche, Wageningen (NL); Lieve Lenaers, Wageningen (NL); Annick Albertine Alfons Dumon, Wageningen (NL); Joren Sweeck, Wageningen (NL); Greta Gerarda F. Gelders, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 875 days.

(21) Appl. No.: 18/190,422

(22) Filed: Mar. 27, 2023

(65) Prior Publication Data

US 2024/0115080 A1 Apr. 11, 2024

Related U.S. Application Data

(63) Continuation of application No. PCT/NL2021/050585, filed on Sep. 28, 2021.

(30) Foreign Application Priority Data

Sep. 28, 2020 (EP) .................................... 20198759

(51) Int. Cl.
*A47J 43/12* (2006.01)
*A23C 13/12* (2006.01)
*A23P 30/40* (2016.01)

(52) U.S. Cl.
CPC ............ *A47J 43/123* (2013.01); *A23P 30/40* (2016.08); *A47J 43/128* (2013.01); *A23C 13/12* (2013.01); *A23C 2210/30* (2013.01)

(58) Field of Classification Search
CPC .. A47J 31/44; A47J 43/12; A47J 31/00; A47J 31/46; A23C 13/12; A23C 9/152;
(Continued)

(56) References Cited

U.S. PATENT DOCUMENTS 3,503,757 A 3/1970 Choi
5,335,588 A * 8/1994 Mahlich ................ B01F 25/311 261/DIG. 16

(Continued)

FOREIGN PATENT DOCUMENTS

EP 1 061 006 A1 12/2000
JP 2012-131573 A 7/2012

(Continued)

OTHER PUBLICATIONS

Quaratesi, EP 3066964 (Year: 2016).*

(Continued)

*Primary Examiner* — Vy T Nguyen
(74) *Attorney, Agent, or Firm* — Sunit Talapatra; Foley & Lardner LLP

(57) ABSTRACT

A foamed product dispensing system, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein
(Continued)

the processing unit is connectable to a gas supply for supplying gas to the product, wherein the system wherein the system is configured to dispense foamed product at a predetermined overrun which is larger than 200%.

21 Claims, 18 Drawing Sheets

(58) Field of Classification Search
CPC ........ A23L 2/54; B01F 101/07; B01F 23/235; B01F 35/42; B01F 35/45; B01F 35/71; B05B 7/26; B65D 83/00
USPC .............. 239/310, 426, 474, 99, 293, 323.1; 426/474; 99/293, 323.1
See application file for complete search history.

(56) References Cited

U.S. PATENT DOCUMENTS

| | | | | |
|---|---|---|---|---|
| 6,810,795 | B1 * | 11/2004 | Hsu | A47J 31/4485 99/452 |
| 2009/0087532 | A1 | 4/2009 | Meier | |
| 2011/0127354 | A1 | 6/2011 | Cubero | |
| 2017/0273500 | A1 * | 9/2017 | Botman | B01F 23/23121 |
| 2018/0360259 | A1 * | 12/2018 | Savioz | A47J 31/4496 |

FOREIGN PATENT DOCUMENTS

| | | |
|---|---|---|
| NL | 1024438 | 10/2003 |
| NL | 1024433 | 4/2005 |
| WO | WO-2009/110794 A1 | 9/2009 |
| WO | WO-2018/158560 | 9/2018 |

OTHER PUBLICATIONS

Wijnen, WO 2009110794 A1 (Year: 2009).*
Van Druten, WO 2014069993 A1 (Year: 2014).*
Int'l Search Report and Written Opinion received in PCT Application No. PCT/NL2021/050585 dated Jan. 7, 2022.

* cited by examiner

FOAMED PRODUCT DISPENSING SYSTEM, PRODUCT CONTAINER, AND PRODUCT DISPENSING MACHINE

CROSS-REFERENCE TO RELATED APPLICATIONS

This application is a continuation of International Patent Application No. PCT/NL2021/050585 filed Sep. 28, 2021, which application claims the benefit of European Patent Application No. 20198759.1 filed on Sep. 28, 2020, both of which are incorporated herein by reference in their entireties.

FIELD OF THE INVENTION

The invention relates to a system for dispensing a product, for instance a milk product, foam, cream or aerated dessert or a different product.

BACKGROUND OF THE INVENTION

Such a system is known from practice in various variants. It is for instance known to contain a spray cream in an aerosol, which aerosol is manually operable for spraying the cream, see for instance European patent application EP 1 061 006A1. Although highly user-friendly, spray cream is usually of poorer quality than whipped cream. Spray cream may be less stable than whipped cream; usually, the initial firmness of spray cream is less than that of whipped cream and furthermore decreases much more rapidly over time than the firmness of whipped cream. One of the causes of this is the absence of a stabilizing network of fat in spray cream. When making whipped cream, during whipping, a network of linked together (interlinked) fat globules (also called partial coalescence) is formed which contributes to the stability of the foam. The cream that is used for spray cream is usually desensitized to partial coalescence, so as to prevent particle coalescence from occurring before spraying through shaking of the aerosol and/or temperature fluctuations (which would lead to clogging of the aerosol). Another cause of the poorer stability of spray cream is the use of, for instance, nitrogen oxide for foaming the cream. Use of nitrogen oxide is often desired because owing to the high solubility of nitrogen oxide in the cream, with an acceptable pressure in the can, sufficient gas can be stored in the can. Here, the gas dissolved in the product is released upon spraying, resulting in highly aerated foam. In addition, the high dissolvability of nitrogen oxide enables the gas to diffuse relatively rapidly from the foamed product leading to a poorer stability.

A second drawback of the known spray cream is that during spraying (involving consecutive dosages from a closed, disposable container, the quality of the spray cream is not constant: the gas content of the initially sprayed cream may be higher than that of the finally sprayed cream, because during spraying, the pressure of the nitrogen oxide drops.

Automated whipped cream machines are known per se from practice and are provided with static or dynamic mixers for whipping cream. Advantages of whipped cream over spray cream concern a different product quality (less aeration, higher firmness and better conservation of firmness over time). However, in general, the known whipped cream machines require much time for preparing the foamed product (compared to spray cream systems), are less user friendly (at least, difficultly operable), relatively less hygienic and therefore required frequent cleaning.

One aspect of the present invention relates in particular to a system for dispensing a foamed product.

Dutch patent NL 1024433 describes a method for obtaining a monodisperse foam, wherein first, a relatively coarse prefoam is produced which prefoam is then passed through a membrane. Dutch patent NL1024438 describes a different method wherein different steam beams are spouted into a product, for instance via a beam divider in the form of a membrane.

PCT/NL2009/050097 (WO2009/110794) discloses an innovative product dispensing system, configured for carrying out a method wherein gas is supplied via a microfiltration device to the product, and wherein the product downstream of the microfiltration device undergoes a mixing treatment and/or undergoes a controlled pressure reduction. The known system is provided with a holder which contains a product to be dispensed, and product discharge means for discharging product coming from the holder, wherein the product discharge means are provided with the microfiltration device which is connectable to a fluid supply for supplying gas to the product during discharge of product, characterized in that the product discharge means are further provided with a processing device which is arranged downstream of said microfiltration device for performing a mixing treatment and/or pressure reduction treatment on the product provided with gas. A respective operating device may be provided with a cavity sealable by a cover, in which the holder is removably placeable. Preferably, the cavity is hermetically sealable from the surroundings by means of the cover, for forming a pressure chamber from the cavity. When the holder is for instance empty, the holder is removed from the operating device, and can for instance be discarded or recycled. Then, a new, (full) holder can be brought into the position for cooperation with the operating device, for the purpose of continuing dispensing of the product. Further, according to one aspect, it is advantageous when in the pressure chamber of the holder a flexible bag is provided, which bag contains the product to be dispensed.

DESCRIPTION OF THE INVENTION

The present invention aims to provide an improved product dispensing system, in particular for efficiently, hygienically dispensing foamed product, in a reliable and user-friendly manner. In particular, an object of the invention is to enable that thus dispensed foamed product has good stability and/or firmness, which is in particular maintained for a relatively long time after dispensing. An object of the invention is to provide a system and method wherein installing and optional removing/replacing of a product holder (e.g. when substantially all the product held by the holder has been foamed by the system so that the holder has become substantially empty) can be carried out swiftly, in a well-controlled manner, and preferably in a hygienic manner. Also, an aim is to provide a reliable means for allowing operation and precise process control. Further, it is aimed to provide a system having an exchangeable product container that can be made in a relatively economical manner, and can still provide a reliable hygienic operation.

Further, the invention aims to provide a product dispensing system that can be reliable, providing a relatively constant product quality under varying circumstances (e.g. change of ambient temperature and/or ambient humidity and/or dispensing location), during relatively long operational periods.

In addition, the invention aims to provide a system that can be implemented in a numerous locations, wherein transport of relatively large amounts of product (to be foamed) to end-user locations can be carried out efficiently, in an economical manner.

One or more of these objects are achieved by the features of any of the independent claims.

A first aspect of the invention provides a foamed product dispensing system, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product According to an embodiment, the system is configured to dispense foamed product at a predetermined overrun which is larger (in other words: higher, greater) than 200%.

It has been found that such a predetermined overrun can yield a foamed product of good quality, in particular with good stability and firmness, i.e. wherein the dispensed product can maintain its foamed structure for a relatively long time after the dispensing.

The gas being supplied to the product can be air, wherein the gas supply means can be an air supply means such as a compressed air supply means. The air supply means can be configured to dry and/or cool the air prior to and/or during the supplying.

Alternatively, for example, the gas being supplied can be nitrogen or a mixture which comprises nitrogen, e.g. a mixture of air and another nitrogen holding gas such as pure nitrogen.

In the present context, overrun can be defined as the volume of gas, e.g. air, in the foamed product as a percentage of the volume of the product without gas. So for example an overrun of 200% indicates that the volume of gas in the foamed product amounts to twice the volume of the product without gas, i.e. two thirds of the volume of the foamed product is formed by gas, e.g. air, while one third of said total volume is formed by liquid and/or solid product. Thus overrun can be evaluated for example by measuring a product volume $V_{pre}$ prior to foaming and a corresponding product volume $V_{post}$ after foaming and subsequently calculating overrun as: $(V_{post}-V_{pre})/V_{pre}\cdot 100\%$.

A second aspect provides the product container of the system according to the first aspect. A third aspect provides the product dispensing machine of the system according to the first aspect.

In an embodiment of one or more of the above-mentioned aspects, the predetermined overrun is larger than 300%.

In an embodiment, the predetermined overrun is smaller (i.e. lower) than 800%.

In an embodiment, the predetermined overrun is smaller than 600%.

In an embodiment, the predetermined overrun is about 400% or about 500%.

It has been found that such a predetermined overrun can yield a foamed product of particularly good quality, in particular with good stability and firmness.

In an embodiment, the product dispensing machine is configured to cool the foamable product in the received product container, for example by cooling the received product container.

In an embodiment, the product dispensing machine is configured to cool the foamable product in the received product container to maintain a temperature of the product in the container within a predetermined temperature range.

In an embodiment, the predetermined temperature range is a temperature range of 4 to 7° C.

Foamable product such as cream can thus be well conserved prior to dispensing.

In an embodiment, the product dispensing machine comprises the gas supply, wherein the gas supply is configured to supply gas at an operational pressure in the range of 3 to 10 bar.

In an embodiment, the gas supply is configured to supply gas at an operational pressure in the range of 4 to 8 bar.

In an embodiment, the gas supply is configured to supply gas at an operational pressure of about 5.5 bar.

Good dispensing results have been obtained with such a system.

In an embodiment, the product container is configured to contain a volume of foamable product in the range of 0.5 to 10 liter.

In an embodiment, the product container is configured to contain a volume of foamable product in the range of 1 to 5 liter.

In an embodiment, the product container is configured to contain a volume of foamable product of about 2 liter.

Preferably the product container contains the volume of foamable product which the container is configured to contain, at least prior to an initial dispensing from said container.

Such a volume is relatively easy to handle by a user and enables a relatively compact system, while also enabling a relatively large amount of product to be dispensed from a single container.

In an embodiment, the product processing unit includes a product feedthrough channel upstream of the frothing device, wherein the product feedthrough channel provides a flow restriction with a representative transversal area (i.e. measured transversal to a direction of flow through the flow restriction) in the range of 1 to 3 $mm^2$.

In an embodiment, the representative transversal area is in the range of 1.2 to 2.2 $mm^2$.

In an embodiment, the representative transversal area is about 1.5 $mm^2$ or about 1.8 $mm^2$.

Good dispensing results have been obtained with such a system.

In an embodiment, the frothing device is provided with one or more microfiltration walls having gas transmissive pores, wherein the one or more microfiltration walls separate a gas supply space associated with the gas supply from a foaming channel associated with the product entrance, wherein each of the microfiltration walls is substantially tubular, extending at a respective wall length along a respective main axis, wherein a sum of the respective wall lengths of the microfiltration walls is preferably in the range of 34 to 50 mm.

In an embodiment, the sum of respective wall lengths is in the range of 38 to 46 mm.

In an embodiment, the sum of respective wall lengths is about 42 mm.

In a preferred embodiment, the number of microfiltration walls of the one or more microfiltration walls is at least two, for example extending in parallel with each other. In this way, a compact frothing device can be achieved that can provide good dispensing results and good throughput.

In an embodiment, the number of microfiltration walls of the one or more microfiltration walls is two.

In an embodiment, one or more mutual differences in respective wall lengths of the microfiltration walls are smaller than 2 mm.

In an embodiment, one or more of said mutual differences is smaller than 1 mm.

In an embodiment, one or more of said mutual differences is about 0 mm.

In an embodiment, the respective wall length of each microfiltration wall is about 21 mm.

Good dispensing results have been obtained with such a system.

In a preferred embodiment, the product processing unit comprises a processing device arranged downstream of the microfiltration device and configured for performing a mixing treatment and/or pressure reduction treatment of the product provided with gas, wherein the processing device comprises an undulating, in particular labyrinth type, fluid path for the product provided with gas.

In an embodiment the length of the undulating fluid path is at least 30 cm, preferably at least 35 cm.

In an embodiment the length of the undulating fluid path is at least 40 cm.

In an embodiment, the length of the undulating fluid path is about 40 cm or about 44.5 cm.

In an embodiment, the length of the undulating fluid path is 50 cm or less than 50 cm.

In an embodiment, the undulating fluid path has a substantially uniform transversal width, in particular substantially universal along its length, in the range of 2.8 to 3.2 mm.

In an embodiment, the undulating fluid path has a substantially uniform transversal representative width, in particular substantially universal along its length, of about 2.8 mm or about 3.0 mm.

A transversal cross section of undulating fluid path or one or more sections thereof, i.e. transverse to a main direction of the path, can have a substantially circular or ellipsoid shape or a different shape, for example having one or more straight sides and/or one or more corners. Different (sub) sections of the undulating fluid path can have different transversal shapes or a same shape.

It will be appreciated that a representative transversal width of the fluid path can be determined substantially irrespective of its transversal shape, e.g. by calculating an average width from multiple transverse widths and/or by determining a largest width and/or a square root of a transversal cross sectional area.

Good dispensing results have been obtained with such a system.

In an embodiment, the undulating fluid path alternatingly comprises first and second path sections, wherein the first path sections are substantially straight and extend substantially parallel to each other, wherein the second path sections each extend at an angle to a direction in which the first path sections extend.

In an embodiment, said angle between the second and first path sections is in the range of 45 to 135 degrees.

In an embodiment, said angle is in the range of 80 to 110 degrees.

In an embodiment, said angle is about 90 degrees.

In an embodiment, the number of first path sections is in the range of 10 to 30.

In an embodiment, the number of first path sections is in the range of 15 to 25.

In an embodiment, the number of first path sections is about 20.

In an embodiment, the total length of the first path sections is at least two times larger than the total length of the second path sections.

In the total length of the first path sections is at least four times larger than the total length of the second path sections.

In the total length of the first path sections is at least six times larger than the total length of the second path sections.

In the total length of the first path sections is at least eight times larger than the total length of the second path sections.

In the total length of the first path sections is about nine times larger than the total length of the second path sections.

The undulating path can e.g. be arranged around the microfiltration device, and may optionally include path sections that extend substantially in parallel with a longitudinal axis of the microfiltration device.

A particularly compact configuration can thus be provided, via one or more of these embodiments.

As an alternative to said undulating path, for example, the processing device can comprises a helical and/or winding and/or spiral path, for the product provided with gas, for example a helical path extending around the microfiltration device.

In an embodiment, the processing device comprises a widening fluid path downstream of the undulating fluid path, said widening fluid path gradually increasing in width along its length in the downstream direction.

In an embodiment, said widening fluid path thus gradually increases in width by a factor of at least two.

In an embodiment, said widening fluid path thus gradually increases in width by a factor of about 2.3.

In an embodiment, the processing device comprises a further fluid path which connects the undulating fluid path to the widening fluid path. The further fluid path can for example substantially extend in a plane in which one or more of the second path sections of the undulating fluid path extend. The further fluid path may be a further undulating fluid path, for example undulating less sharply and/or less frequently compared to the undulating fluid path.

In an embodiment, said length of the widening fluid path, and/or a sum of respective lengths of the widening fluid path and the further fluid path, is in the range of 40 to 100 mm.

In an embodiment, said length of the widening fluid path, and/or a sum of respective lengths of the widening fluid path and the further fluid path, is in the range of 50 to 90 mm.

In an embodiment, said length of the widening fluid path, and/or a sum of respective lengths of the widening fluid path and the further fluid path, is in the range of 60 to 80 mm.

In an embodiment, said length of the widening fluid path, and/or a sum of respective lengths of the widening fluid path and the further fluid path, is about 70 mm.

A product discharge channel which can e.g. form the widening fluid path or part thereof can terminate e.g. via a product shaping nozzle (spout), e.g. having an array of product-shaping teeth or the-like (known as such, and sometimes called a 'tulip').

Good dispensing results have been obtained with such a system.

A further aspect of the invention, which aspect may be combined with one or more other aspects of the invention, provides a foamed product dispensing system, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the system includes a hermetically sealable wall structure that encloses a container receiving space for receiving the container, wherein the wall structure preferably includes a thermally insulated and/or cooled product outlet port.

Such a configuration can enable that hygienically undesired conditions such as product being insufficiently cooled and/or humid air being in contact with unclispensed product can be better prevented. Also, the system, in particular a cooling subsystem thereof, can thus be more energetically efficient.

It will be appreciated that such an exchangeable product container can be realized in various ways, at least some of which will be elucidated further in the present description. For example, the product container may comprise a flexible bag which is exchangeable and/or the product container may comprise a pressure chamber or capsule which is exchangeable, or alternatively the product container can be fixed into the dispensing machine Combinations of such options are also possible. For example, an exchangeable capsule may be provided with an exchangeable flexible bag therein, wherein the exchangeable flexible bag may be exchangeable from the exchangeable capsule.

The product container or parts thereof may be suitable or unsuitable for reuse (wherein unsuitability for reuse can be associated with disposability of such a container, the container e.g. being part of a product packaging in which the product can be transported). For example, such a capsule may be suitable or unsuitable for reuse, and such a flexible bag may be suitable or unsuitable for reuse.

An exchangeable capsule or pressure chamber can e.g. be realized in the form of a plastic, e.g. PET, container, e.g. bottle, in which product is contained, e.g. without a flexible bag therein.

It will also be appreciated that the presence of an exchangeable product container does not exclude the presence of a different product container which is not exchangeable. For example, a pressure chamber or capsule may be non-exchangeable, i.e. substantially fixed in (and thereby e.g. part of) the dispensing machine, wherein the capsule is configured to hold an exchangeable product container, e.g. comprising a flexible bag, therein.

The present disclosure also provides a product container for a foamed product dispensing system as described above, wherein the product container is provided with a valve member as described above.

A further aspect of the invention, which aspect may be combined with one or more other aspects of the invention, provides a foamed product dispensing system, for example a system according to any of the preceding claims, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the product dispensing machine is configured for pressurizing a placed product container to at least two (mutually different) operating pressures for supplying product to the processing unit, the dispensing machine preferably including a user operable controller for selecting a desired container operating pressure, wherein more preferably said gas supply is configured for providing a predetermined gas flow rate during operation that is substantially independent of a set product container operating pressure.

In this way, by selecting a higher operating pressure, a product-to-air ratio of dispensed product can be increased, i.e. more product can be dispensed with respect to the amount of air in the dispensed product, wherein product-to-air ratio can be associated with firmness of the dispensed foamed product. Thus, for example, a user can modify product overrun.

A further aspect of the invention, which aspect may be combined with one or more other aspects of the invention, provides a foamed product dispensing system, for example a system according to any of the preceding claims, wherein the system includes: a product dispensing machine, configured to receive an exchangeable product container; a product container, configured to cooperate with the product dispensing machine, after placement in the machine; wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product, wherein the gas supply is a choked flow gas supply, including a gas restriction for achieving choked flow during operation, wherein the flow constriction is arranged in one of: a fluid injector connector of the product dispensing machine, in particular in a distal part of the fluid injector; and the product processing unit. The fluid injector connector can be movable with respect to another part of the machine, for example actively movable by an actuator and/or resiliently movable by contact with the product processing unit.

In this way, a dead volume of gas between the flow constriction and (a part of) the frothing device can be reduced, so that fluid pressure can be build up more rapidly at the frothing device, e.g. around the start of dispensing product.

The gas supply may be configured to provide a gas buffer volume upstream of the flow constriction, in particular for providing a pressurized gas buffer, the gas buffer volume in particular being located between a gas pressurization pump of the system and the flow restriction, wherein preferably a minimum volume of the buffer volume is 0.5 liter.

Such a gas buffer volume can provide more rapid initial pressurization at the flow constriction.

The gas supply may comprise a condensate block arranged upstream of the flow constriction and configured to cool and/or dry gas in the gas supply, wherein the condensate block comprises a drain valve for draining condensate from the condensate block, wherein the drain valve is fluidly connected to the product container and/or to a receiving space of the machine, which receiving space is configured for receiving the product container.

In this way, air can drain from the product container through the condensate block through the drain valve into the atmosphere.

According to another aspect, which can optionally be combined with one or more other aspects, there is provided a foamed product dispensing system, wherein the system includes:

- a product dispensing machine, configured to receive an exchangeable product container and for example to pressurize the product container;
- a product container, configured to cooperate with the product dispensing machine, after placement in the machine;
- wherein the product container contains a foamable product, wherein the product container is provided with a product processing unit (CPU) including a frothing device having a product entrance for receiving product and a product exit for discharging product, wherein the processing unit is connectable to a fluid (in particular gas) supply for supplying gas to the product (preferably during product discharge), wherein the product processing unit is preferably provided with a processing device which is arranged downstream of said frothing device, for performing a mixing treatment and/or pressure reduction treatment on the product provided with gas,
- wherein the product processing unit includes a product feedthrough channel upstream of the frothing device, closable by a valve member.

In this way, a particularly user-friendly system can be provided, and can dispense foamed product of a high quality in a reliable, hygienic manner. Furthermore, the system can be of compact, robust and economic design. In particular, the CPU's valve member (being part of the product container) can thus be configured for controlling product flow towards the micro filtration device, thereby allowing for a compact configuration and reliable construction. In particular, installing of the product container into the product dispensing machine can lead to the CPU's valve member being brought into cooperation with respective machine components, in particular a valve member actuator of the machine, wherein the coupling can for example automatically lead to connecting the fluid supply as well. After such installation, the valve member is available to control product flow (depending on respective machine control states). For example, after installing of the container (wherein the valve member of the CPU is connected to or gets into communication with a machine actuator component) the system can be advantageously configured to prevent product from being dispensed while such dispensing is not desired and/or not controlled by a respective operating device of the system. Also, hygienic use can be provided by implementing an exchangeable product container (integrally including the product processing unit), avoiding potential hygiene issues caused by parts of the product dispensing machine itself getting into contact with the product. It is preferred that the product container and its CPU are substantially recyclable.

According to a further embodiment, the dispensing machine includes a valve actuator, configured to cooperate with the valve member of a placed product container for moving the valve member between a product feedthrough state and a product flow blocking state.

Good foamed product dispensing results have been achieved in case the dispensing machine is configured to feed a dry or dried fluid to the fluid feedthrough channel of the product processing unit of a placed product container.

According to a further embodiment, the dispensing machine is configured to feed air to the fluid feedthrough channel of the product processing unit of a placed product container. In that case, preferably, the dispensing machine includes an air dryer for removing water from the air, thereby providing improved product dispensing results.

Advantageously, the dispensing machine is designed to cool said holder, preferably such that the temperature of the product in the holder (H) is lower than 10° C., in particular lower than 5° C. For example, an afore-mentioned air dryer can be embedded in or forms part of a cooling system of the dispensing machine, combining various functions.

According to a further embodiment, the product container can be a substantially cylinder-shaped or bucket-shaped capsule, configured to be pressurized, e.g. to a pressure of at least about 2 bar. For example, an outer wall of the container (or 'the capsule') can be made of steel, aluminum, or rigid plastic (e.g. fiber reinforced plastic), or a combination of such materials.

According to a non limiting, but preferred, embodiment, a length of the capsule can be in the range of about 20 to 40 cm, wherein an external diameter of the capsule is in the range of about 10 to 30 cm.

Also, preferably, the capsule contains at least 4 liter or at least 4 kg product before initial use, so that a relatively large amount of product is available to allow for relatively long operational times (before the container has to be exchanged with a fresh one).

In a preferred embodiment, the product dispensing machine includes a container receiving space for receiving the product container, the product container being exchangeable from the respective container receiving space, wherein a direction of container placement (into that space) is a preferably substantially horizontal direction. This is in particular advantageous in case of placing (and replacing) a relatively heavy container. It is preferred that the dispensing machine includes a container guide for guiding the container into and out of the container receiving space (along said placement direction).

According to a further embodiment, the product processing unit extends through an outer wall of the holder, in particular spaced-apart from a top wall and a bottom wall of the holder.

Preferably, the holder defines an inner space which includes a flexible bag filled with foamable product to be discharged. For example, the holder can include a fluid inlet for receiving fluid from the product dispensing machine, in particular from a respective fluid outlet that connects to the fluid inlet after placement of the holder in the machine, in order to pressurize the inner space of the holder.

Preferably, the frothing device is provided with a microfiltration wall having gas transmissive pores, for instance, a tubular wall, which separates a gas supply space associated with the fluid supply from a foaming channel associated with the product entrance.

For example, good results are achieved in case a length of the foaming channel measured in a product flow direction is at most 10 cm.

Said length can be at most 5 cm, and more particularly is in the range of approximately 0.5-5 cm, for instance, approximately 2 cm or approximately 3 cm.

Preferably, the frothing device is provided with a filtration wall with gas transmissive pores having a pore size in the range of 0.1-10 microns, in particular a pore size of at least 0.1 micron and less than 2 microns, more particularly a pore size of at least 0.2 micron and less than 1.5 microns. It will be appreciated that, within the scope of the present disclosure, other pore sizes than those mentioned are possible. For example, in a non-limiting embodiment the pore size can be substantially in the range of 5 to 10 micron. Also, various different pore sizes and/or pore size ranges may be present in any single filtration wall.

For example, the frothing device can be provided with a housing comprising a product entrance for supply of product, a gas inlet for supply of gas, and an exit for discharge of product provided with gas, wherein said gas inlet terminates in a gas receiving space which is separated by means of a microfiltration wall from said product entrance and exit.

According to a preferred embodiment, the product dispensing machine is provided with or connectable to a gas supply to supply gas, e.g. air, under super-atmospheric pressure to the frothing device of the processing unit.

Also, it is preferred that the product dispensing machine is provided with a control unit, preferably being user operable via a user interface or operating device of the machine, the control unit being configured for controlling fluid flow and product flow to the processing unit, wherein the control unit is preferably configured to start fluid flow before product flow in case of initiating a product discharge (thereby preventing clogging of the frothing device).

According to a preferred embodiment, the product processing unit is designed to introduce gas bubbles into the product, in particular for forming a homogeneous foam.

According to a preferred embodiment, said fluid is gas or a gas mixture, for instance, nitrogen, or air.

According to a preferred embodiment, the product present in the holder is a food product, for example cream.

Moreover, according to an extra advantageous aspect, the product processing unit can include an airtight adjustable seal configured to hermetically seal a product flow path between the product processing unit and the product container before initial use, for example before the container is used (e.g. pressurized) for a first time in the machine, and to provide a passage for flow of product from the product container towards the frothing device during use of the product container, e.g. upon a certain pressurization of seal.

The adjustable airtight seal can be embodied in various ways, for example by a valve member, a spring loaded one-way valve or return valve, by a breakable or tearable sealing member that automatically breaks or ruptures at a predetermined (control/opening) pressure, or by a sealing cap that moves from a sealing position to a flow path release position under influence of a predetermined control pressure, and/or the-like. It is preferred that the airtight adjustable seal is located upstream of the frothing unit, but that is not required.

The adjustable seal can e.g. be adjustable from an airtight product flow blocking state to a product flow release state under influence of an opening pressure in the pressurized product container, wherein the opening pressure is a super-atmospheric pressure.

Further, according to an embodiment, a wall of the product container can include a flexible and/or elastic portion, allowing an internal volume of the container to change or increase.

Further, an aspect of the invention provides a foamed product dispensing system, for example a system according to the above-described aspect, wherein the system includes:

- a product dispensing machine, configured to receive an exchangeable product container;
- a product container, configured to cooperate with the product dispensing machine, after placement in the machine;
- wherein the product container contains a foamable product,
- wherein the product container is provided with a product processing unit including a frothing device having a product entrance for receiving product from the container and a product exit for discharging product, wherein the processing unit is connectable to a fluid supply for supplying gas to the product during product discharge, wherein the product processing unit is further provided with a processing device which is arranged downstream of said frothing device, for performing a mixing treatment and/or pressure reduction treatment on the product provided with gas,
- wherein the product container is a substantially cylinder-shaped or bucket-shaped capsule, configured to be pressurized, e.g. to a pressure of at least 2 bar,
- wherein a length of the capsule is in the range of about 20 to 40 cm, wherein an external diameter of the capsule is in the range of about 10 to 30 cm,
- wherein the product dispensing machine includes a container receiving space for receiving the product container, the product container being exchangeable from the respective container receiving space, wherein a direction of container placement is a preferably substantially horizontal direction or a direction extending at a small angle with respect to a horizontal plane, for example an angle smaller than 45 degrees.

In this way a user friendly, easy to install, foamed product dispensing system can be provided. The capsule is relatively large, allowing for a relatively large amount of product to be loaded into the dispensing machine at initial use. Also, handling of the container can be achieved by a single person. As is mentioned before, to assist the user it is preferred if the dispensing machine includes a container guide for guiding the container into and out of the container receiving space (along said placement direction).

According to another aspect of the invention, which can optionally be combined with any of the above-mentioned aspects, there is provided a foamed product dispensing system, wherein the system includes:

- a product dispensing machine, configured to receive an exchangeable product container;
- a product container, configured to cooperate with the product dispensing machine, after placement in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a gas supply for supplying gas to the product,
- wherein the system is configured so that the gas supply is configured to provide a choked flow gas supply.

In this way, a constant gas flow rate towards the frothing device can be achieved during operation, in particular substantially independent on any change the frothing device might experience during a certain operational period. For example, in the case that the frothing device includes small pores for injecting the gas into the product, the application of a choked flow gas supply can suppress pore clogging and/or lead to proper an reliable functioning of the frothing device in case any pore clogging does happen.

Further, there is provided a product container, evidently configured to be part of a system according to the invention, wherein the product container contains a foamable product, wherein the product container is provided with a product processing unit including a frothing device having a product entrance for receiving product and a product exit for discharging product, wherein the processing unit is connectable to a fluid supply for supplying gas to the product during product discharge, wherein the product processing unit is further provided with a processing device which is arranged downstream of said frothing device, for performing a mixing treatment and/or pressure reduction treatment on the product provided with gas,

- wherein the product processing unit includes a product feedthrough channel upstream of the frothing device, closable by a valve member,
- wherein the product processing unit includes a fluid feedthrough channel upstream of the frothing device, wherein said valve member is configured for providing a fluid communication between said fluid feedthrough channel of the product processing unit and a fluid supply of the dispensing machine.

Thus, above-mentioned advantages can be achieved as well. In a preferred embodiment, the container is configured to provide a pressure vessel, a container wall e.g. being made of steel or another rigid material suitable to provide such a pressure vessel.

Further, an aspect of the invention provides an innovative a method for dispensing foamed product, comprising:

- receiving an exchangeable product container in a product dispensing machine, wherein the product container contains a foamable product, preferably a food product, for example cream, wherein the product container is provided with a frothing device and a product feedthrough channel, closable by a valve member;
- discharging product from the product container;
- moving the valve member from a product flow blocking state to a product feedthrough state;
- supplying gas, for instance nitrogen gas or air, preferably dried air, preferably at super-atmospheric pressure, via the frothing device to the product (e.g. before and/or during product discharge) to introduce gas bubbles into the product, in particular for forming a homogeneous foam;
- and optionally reducing a pressure of the product supplied with gas.

In this way the valve member is used to control product flow, allowing a compact, hygienic and reliable way of dispensing (and foaming) the product.

According to another aspect of the invention, which can optionally be combined with any of the above-mentioned aspects, there is provided a foamed product dispensing system, wherein the system includes:

- a product dispensing machine, configured to receive an exchangeable product container;
- a product container configured to cooperate with the product dispensing machine, after placement in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
- wherein the product dispensing machine includes a container receiving space for receiving the product container, the product container being exchangeable from the respective container receiving space, wherein a direction of container placement is a preferably substantially horizontal direction or a direction extending at a small angle with respect to a horizontal plane, for example an angle smaller than 45 degrees,
- wherein the dispensing machine is configured to cool said product container after placement in the container receiving space, preferably such that the temperature of the product in the container including in the product processing unit is lower than 10° C., in particular lower than 5° C.

Preferably, the dispensing machine includes at least one cooling duct containing a cooling liquid, wherein the cooling duct preferably surrounds at least part of the container receiving space, for example extending along a helical path around the container receiving space.

Preferably, the container receiving space is defined by a wall structure, surrounding that space, the wall structure preferably including a closable foamed product passage below the processing unit of a placed product container. Preferably, the wall structure includes or is provided with a said cooling duct.

According to another aspect of the invention, which can optionally be combined with any of the above-mentioned aspects, there is provided a foamed product dispensing system, including:

- a product dispensing machine, configured to receive an exchangeable product container;
- a product container configured to cooperate with the product dispensing machine, after placement in the machine;
- wherein the product container has a product holding space containing a foamable product, for example a food product, for example cream,
- wherein the product container is provided with a product processing unit including a frothing device having a product entrance for receiving product and a product exit for discharging product, wherein the processing unit is connectable to a fluid supply for supplying gas to the product,
- wherein the product processing unit includes an airtight seal configured to hermetically seal a product flow path between the product processing unit and the product holdings space of the product container before initial use of the product container, and to provide a passage for flow of product from the product container towards the frothing device during use of the product container, Preferably, the airtight seal is located adjacent to or at or in a product discharge opening of the product holding space of the container. Also, preferably, the airtight seal is adjustable from a flow blocking state to a product flow release state under influence of an opening pressure upstream of the seal, for example a pressure in the product holding space of the product container, wherein the opening pressure is a super-atmospheric pressure.

Further, preferably, a wall of the product container includes a flexible and/or elastic portion, allowing an internal volume of the container to change or increase.

According to another aspect of the invention, which can optionally be combined with any of the above-mentioned aspects, there is provided a foamed product dispensing system, including:

- a product dispensing machine, configured to receive an exchangeable product container;
- a product container, configured to cooperate with the product dispensing machine, after placement in a pressurization chamber in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the pressurization chamber is defined by a wall structure, the wall structure including a CPU-receiving port for receiving the product processing unit, and for engaging an exterior surface of the product processing unit in an airtight manner, the product processing unit in particular protruding through the port towards a product discharging area.

Preferably, the airtight engagement of the exterior surface of the product processing unit and the CPU-receiving port is configured to withstand pressurization of the a pressurization chamber, Also, preferably, the engagement between the product processing unit and the CPU-receiving port of the machine is releasable, in particular allowing replacement of the product container.

The system is preferably configured to provide feedback to a user regarding engagement between the product processing unit and the receiving port. The CPU receiving port and the product processing unit are preferably configured to jointly produce a sound and/or a haptic feedback signal, for example a click, upon such engagement.

According to another aspect of the invention, which can optionally be combined with any of the above-mentioned aspects, there is provided a foamed product dispensing system, including:

a product dispensing machine, configured to receive an exchangeable product container;

a product container, configured to cooperate with the product dispensing machine, after placement in the machine;

wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the product processing unit is provided with an airtight sealing cap configured to seal a downstream product discharge area of the product processing unit from an environment, the downstream area containing a product discharge nozzle of the system.

According to another aspect of the invention, which can optionally be combined with any of the above-mentioned aspects, there is provided a foamed product dispensing system, the system including:

a product dispensing machine, configured to receive an exchangeable product container;

a product container, configured to cooperate with the product dispensing machine, after placement in the machine;

wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein, during use, the product processing unit extends outside a pressurized space of the system, wherein a border of the pressurized space includes a CPU opening for exchangeably receiving the product processing unit, wherein the system includes a wall structure, the wall structure including a CPU-receiving port for receiving the product processing unit, wherein a shape of the product processing unit is configured to substantially mate with a shape of the CPU receiving port for positioning the product processing unit with respect to the wall structure, wherein a shape of the product processing unit and a corresponding shape of the CPU receiving port are preferably rotationally asymmetric about an axis that substantially corresponds to a direction of receiving the processing unit in the port.

Preferably at least one of the shape of the product processing unit and the shape of the CPU opening is a tapered shape.

According to another aspect of the invention, which can optionally be combined with any of the above-mentioned aspects, there is provided a foamed product dispensing system, including:

a product dispensing machine, configured to receive an exchangeable product container;

a product container, configured to cooperate with the product dispensing machine, to be pressurized, after placement in the machine, wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product, wherein the system further includes an exchangeable or non-exchangeable capsule configured to exchangeably receive the product container, wherein the machine is configured to exchangeably receive the capsule containing the product container.

In a preferred embodiment, the capsule is configured to cooperate with the product dispensing machine to be pressurized.

Furthermore, preferably, the capsule preferably comprises a removable, at least hingeable, lid for providing access to the internal space of the capsule for exchanging the product container, wherein the lid is preferably configured to cooperate with a remaining part of the capsule to form an airtight connection there-between when the lid is in an assembled closed position, The product container preferably comprises a flexible bag containing product. Also, preferably, the capsule is a rigid capsule. The capsule can have various shapes, for example (but not limited to) the a cylinder-shape and/or bucket-shape.

According to another aspect of the invention, which can optionally be combined with any of the above-mentioned aspects, there is provided a product container, evidently configured to be part of a system according to the invention. The product container contains a foamable product, wherein the product container is provided with a product processing unit including a frothing device having a product entrance for receiving product and a product exit for discharging product, wherein the processing unit is connectable to a fluid supply for supplying gas to the product, wherein the product processing unit is preferably provided with a processing device which is arranged downstream of said frothing device, for performing a mixing treatment and/or pressure reduction treatment on the product provided with gas.

According to a further embodiment, the frothing device has at least one microfiltration wall that includes a hydrophobic and/or oleophobic material, for example PTFE (polytetrafluorethylene) and/or hexafluoropropylene.

According to a further embodiment the product processing unit includes an airtight seal configured to hermetically seal a product flow path between the product processing unit and a product holding space of the product container before initial use of the product container, and to provide a passage for flow of product from the product container towards the frothing device during use of the product container.

According to a further embodiment, the product processing unit is configured to cooperate with a receiving port of a wall structure of a pressurization chamber, for mutual engagement in an airtight manner.

According to a further embodiment, the product processing unit is provided with an airtight sealing cap configured to seal a downstream product discharge area of the product processing unit from an environment, the downstream area containing a product discharge nozzle of the container.

According to a further embodiment, the container includes a wall structure, the wall structure including a CPU-receiving port for receiving the product processing unit, wherein a shape of the product processing unit is configured to substantially mate with a shape of the CPU receiving port for positioning the product processing unit with respect to the wall structure of the container.

According to a further embodiment, the product container comprises a flexible bag containing product, wherein the flexible bag is at least partly flexible for allowing change of an internal volume of the bag.

According to another aspect of the invention, which can optionally be combined with any of the above-mentioned aspects, there is provided a foamed product dispensing system, wherein the system includes:

- a product dispensing machine, configured to receive an exchangeable product container;
- a product container, configured to cooperate with the product dispensing machine, after placement in the machine;
- wherein the product container contains a foamable product, preferably a food product, for example cream, wherein the product container is provided with a product processing unit including a frothing device having a product entrance for receiving product and a product exit for discharging product, wherein the processing unit is connectable to a fluid supply for supplying gas to the product,
- wherein the frothing device is provided with a microfiltration wall having gas transmissive pores, for instance, a tubular wall, which separates a gas supply space associated with the fluid supply from a foaming channel associated with the product entrance,
- wherein the microfiltration wall includes a hydrophobic and/or oleophobic material, for example PTFE (polytetrafluorethylene) and/or hexafluoropropylene.

For example, the microfiltration wall can be made of a hydrophobic material, or it can contain a certain amount of hydrophobic material. Additionally or alternatively, the microfiltration wall can include a coating that includes or consist of a hydrophobic and/or oleophobic material. For example, such a coating can be applied in various ways, for example via one or more of plasma coating, vapour deposition, chemical vapour deposition, immersion coating, or differently.

Further, there is provided a product container, evidently configured to be part of a system according any of the above-described aspects of the invention, wherein the product container contains a foamable product, wherein the product container is provided with a product processing unit including a frothing device having a product entrance for receiving product and a product exit for discharging product, wherein the processing unit is connectable to a fluid supply for supplying gas to the product during product discharge,

- wherein the frothing device is provided with a microfiltration wall having gas transmissive pores, for instance, a tubular wall, which separates a gas supply space associated with the fluid supply from a foaming channel associated with the product entrance,
- wherein the microfiltration wall is configured to prevent clogging of the microfiltration wall,
- wherein the microfiltration wall includes a hydrophobic and/or oleophobic material, for example PTFE (polytetrafluorethylene) and/or hexafluoropropylene.

It has been found that in this way, a further reliable and durable operation of the system can be achieved, wherein the application of the hydrophobic and/or oleophobic material can lead to a reduction of chances of clogging of the pores of the microfiltration wall.

According to another aspect of the invention, which can optionally be combined with any of the above-mentioned aspects, there is provided a method for producing an airtightly sealed product container containing sterilized foamable product, wherein the product container includes a sterilized frothing device, a sterilized valve member, a sterilized sealed off fluid inlet for connection to a gas supply after unsealing and a sterilized sealed off discharge channel for discharging foamed product after unsealing, wherein the method comprises:

- providing a product container containing foamable product, wherein the product container is airtightly connected to an assembly including a frothing device, a valve member, a fluid inlet for connection to a gas supply and a discharge channel for discharging foamed product;
- providing the fluid inlet and the discharge channel with a removable airtight seal to airtightly seal off said fluid inlet and said discharge channel from ambient air; and
- sterilizing, for example irradiating and/or heating, the product container provided with foamable product, assembly and seal.

Non-limiting examples of the invention will be explained in the following, with reference to the accompanying drawings.

FIG. 1 schematically shows a perspective view of an exemplary foamed product dispensing system according to an example of the invention;

Figure 3A:
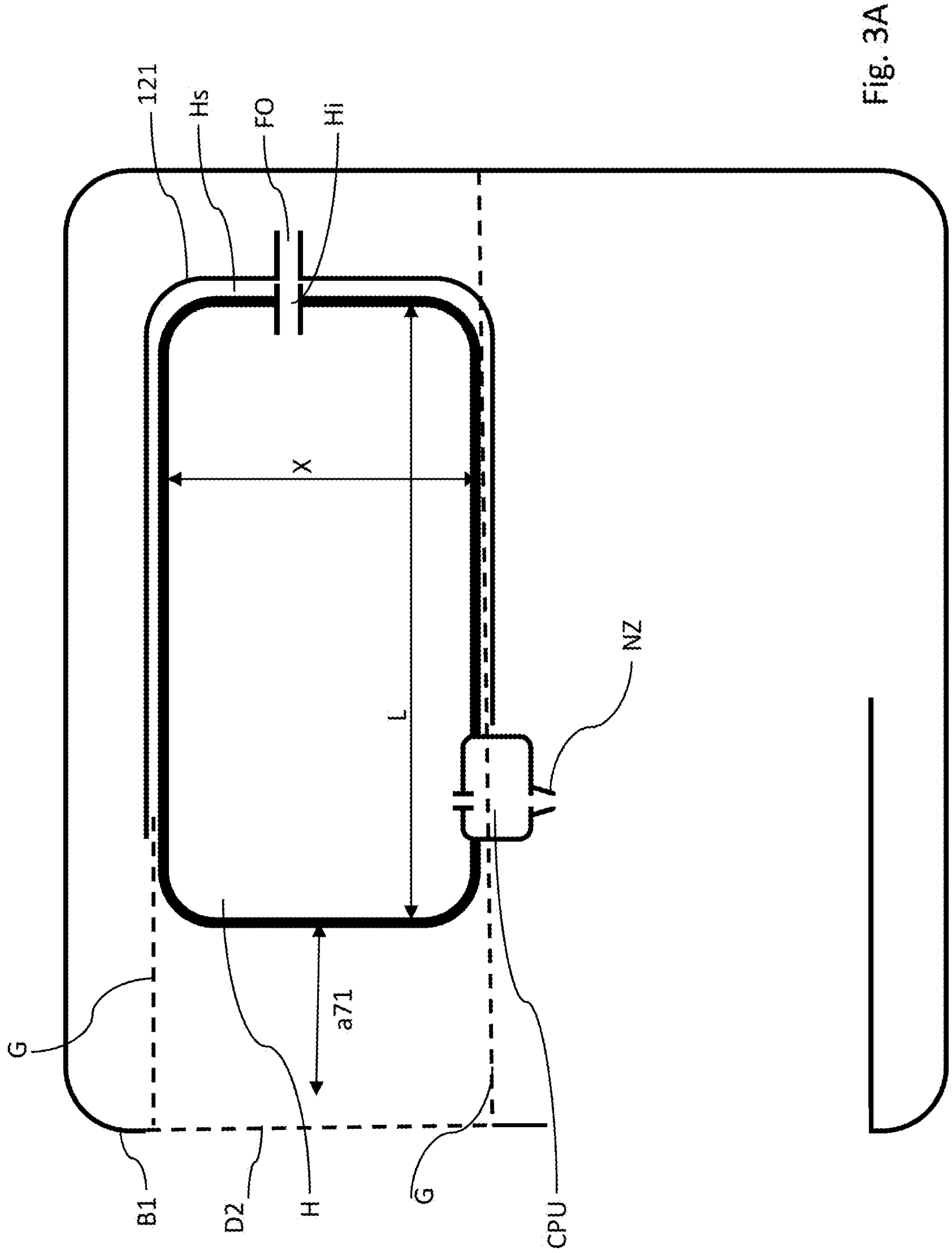
FIG. 3A shows a schematic vertical cross-section view of part of the system of FIG. 1, during unloading/loading a product container.
Figure 3B:
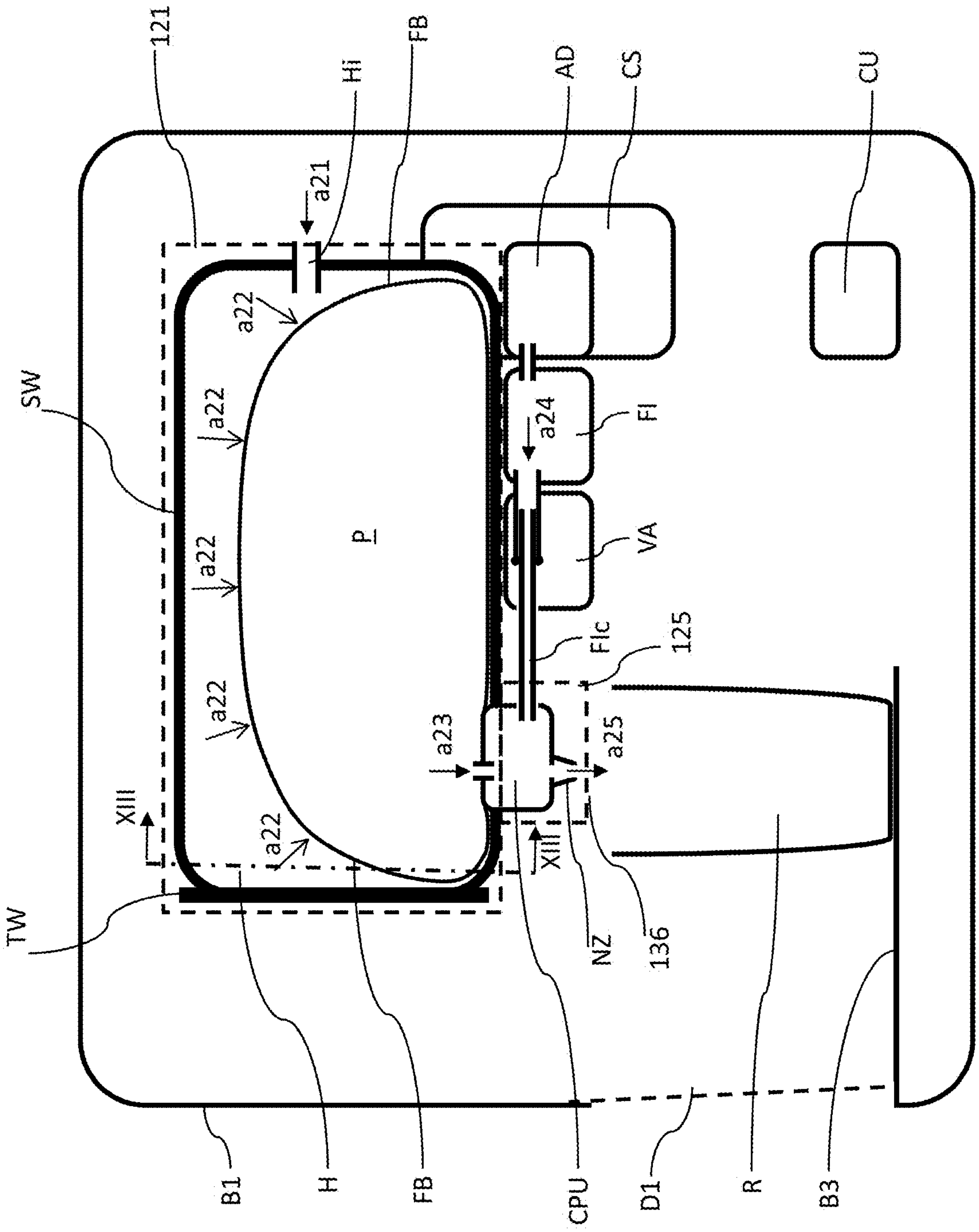
FIG. 3B is similar to FIG. 3A, showing further components of the system.
Figure 8B:
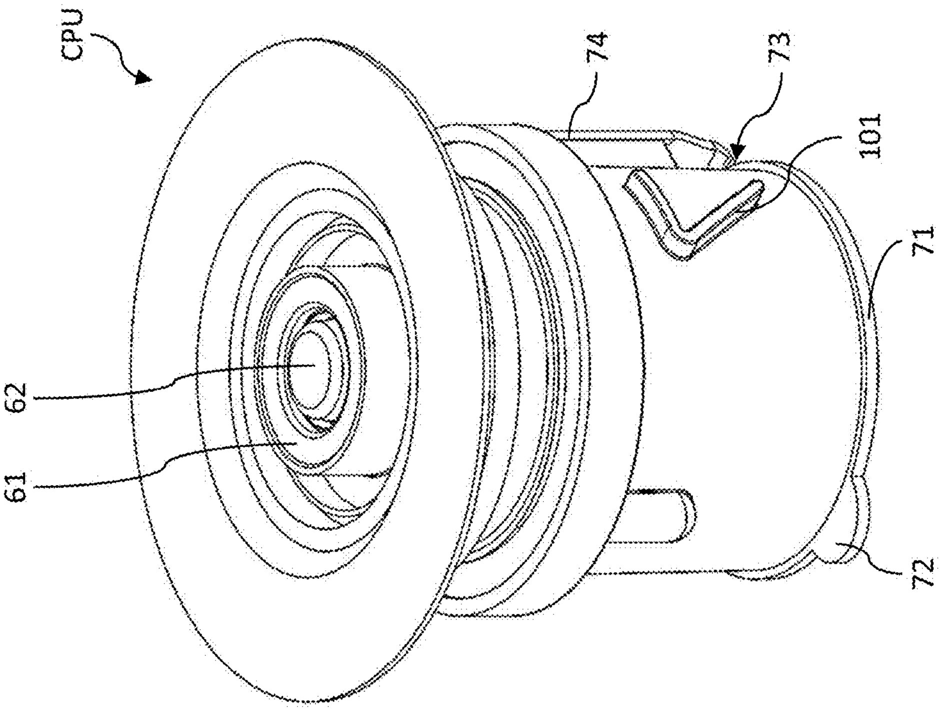
Figure 8A:
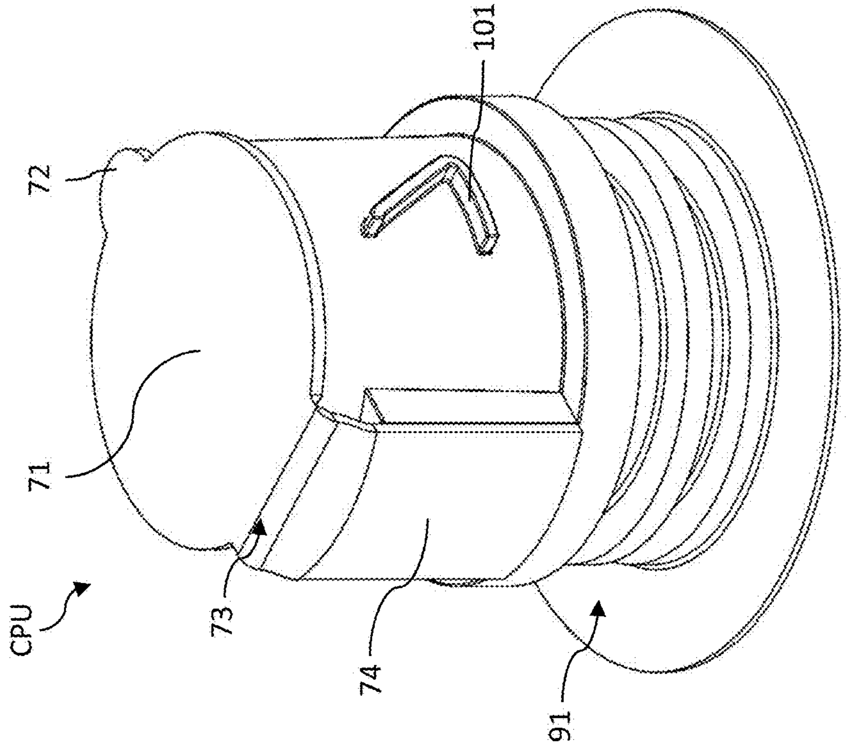
Figure 9:
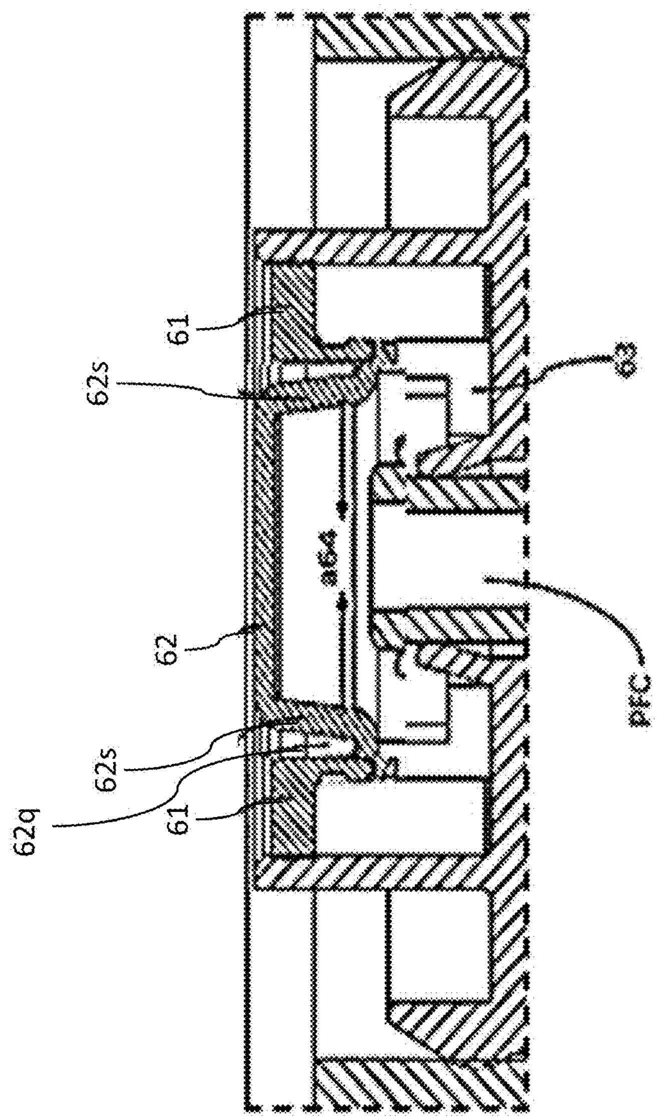
Figure 10:
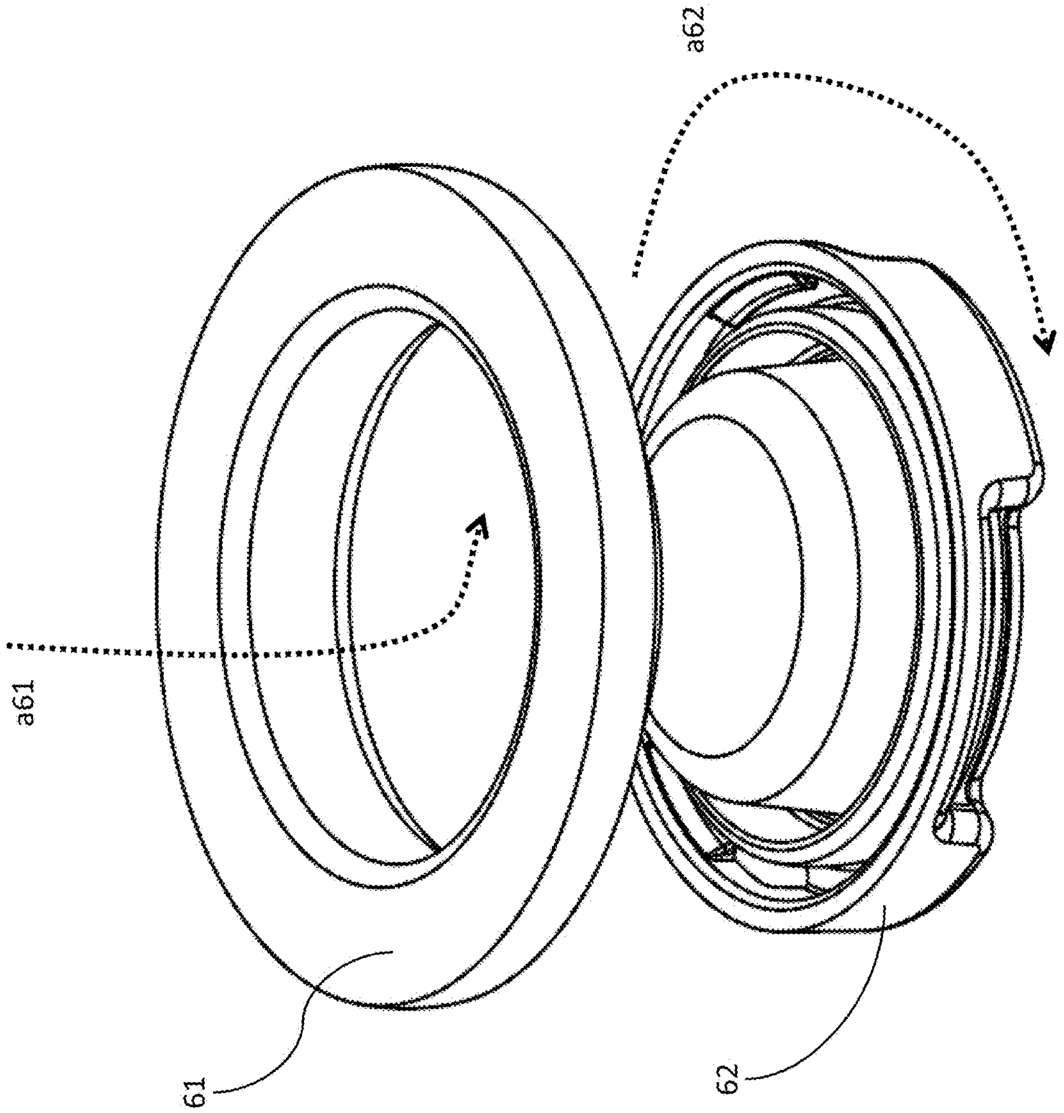
Figure 11:
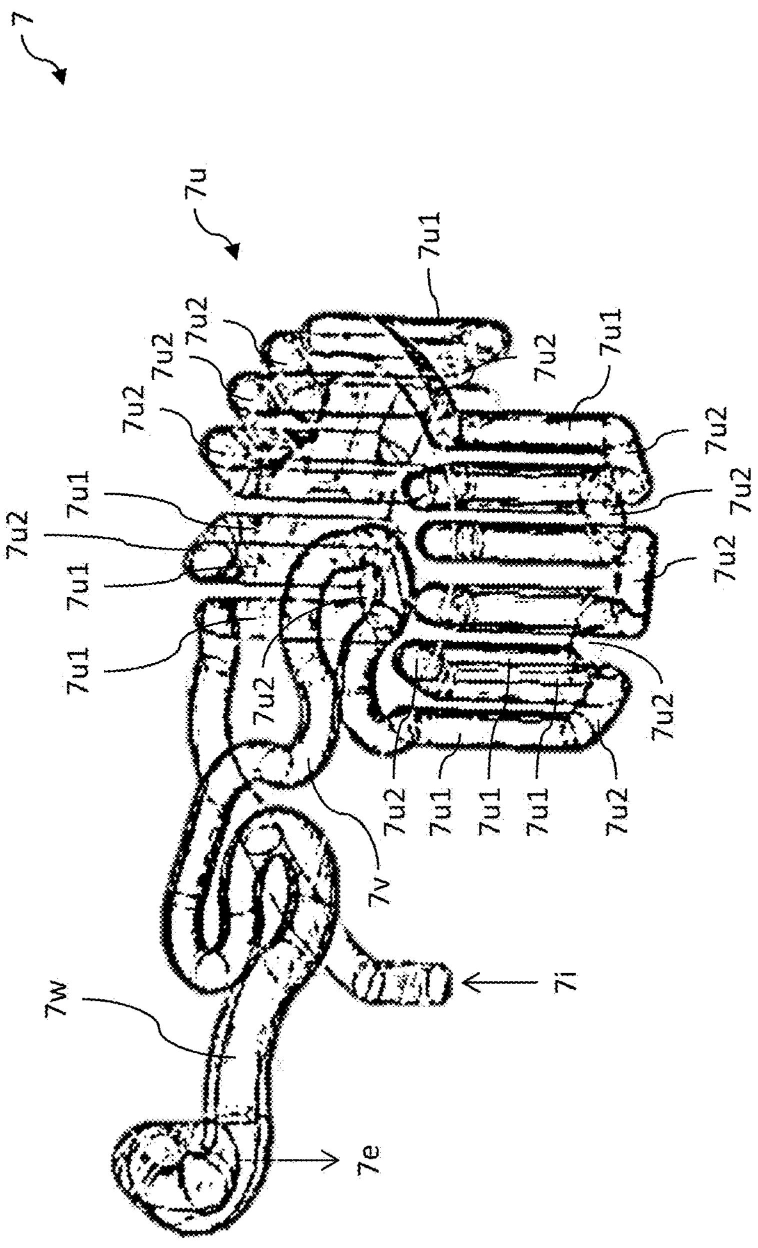
Figure 12A:
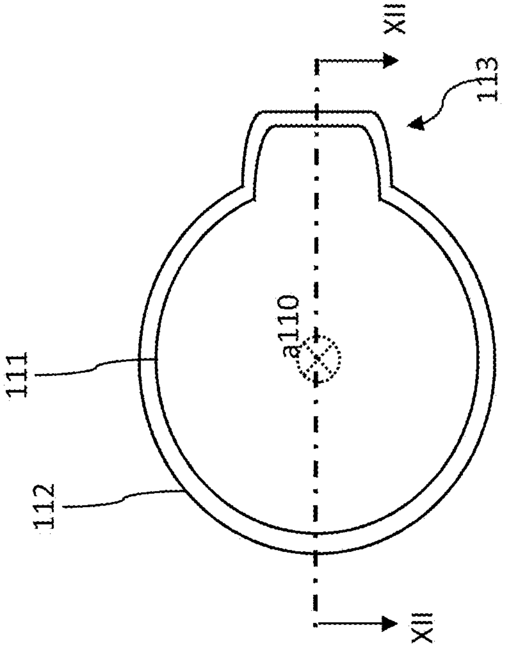
Figure 12B:
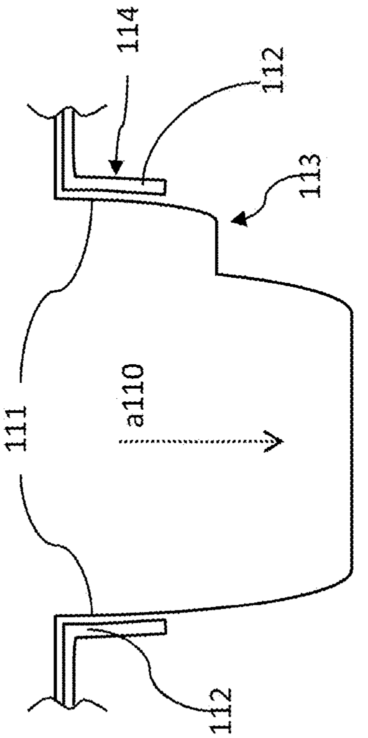
Figure 13:
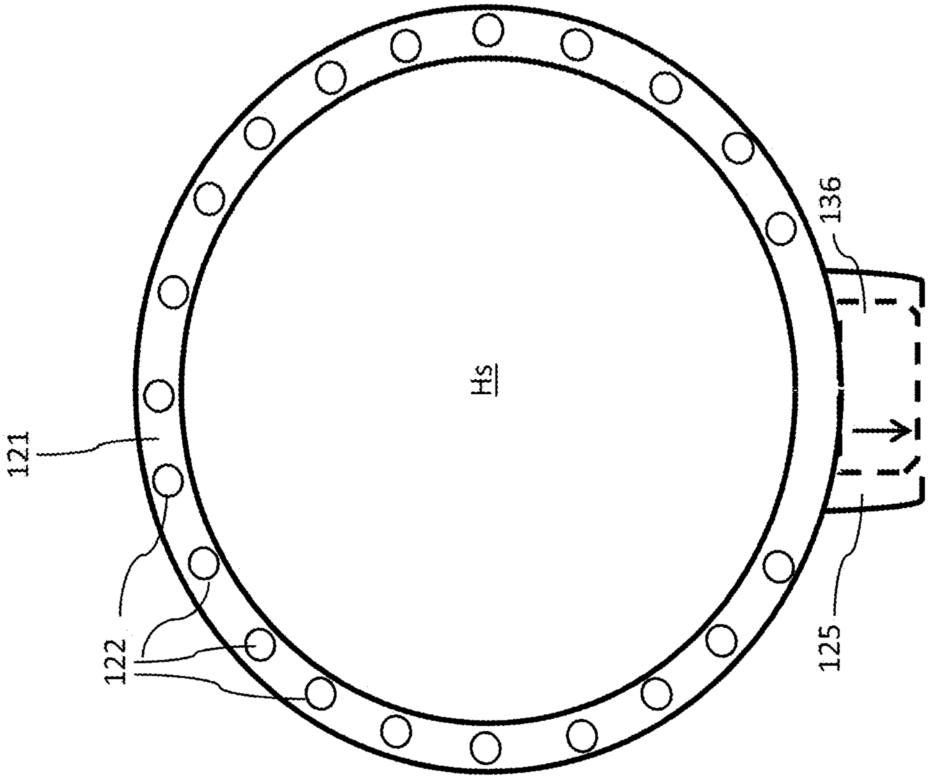
Figure 14:
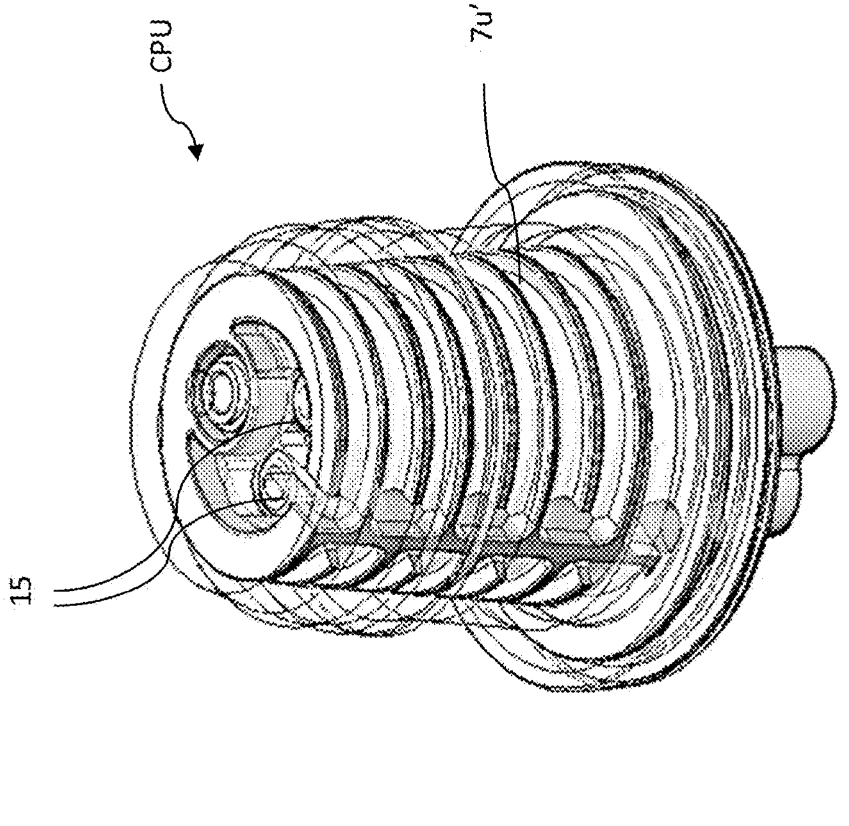
Figure 15:
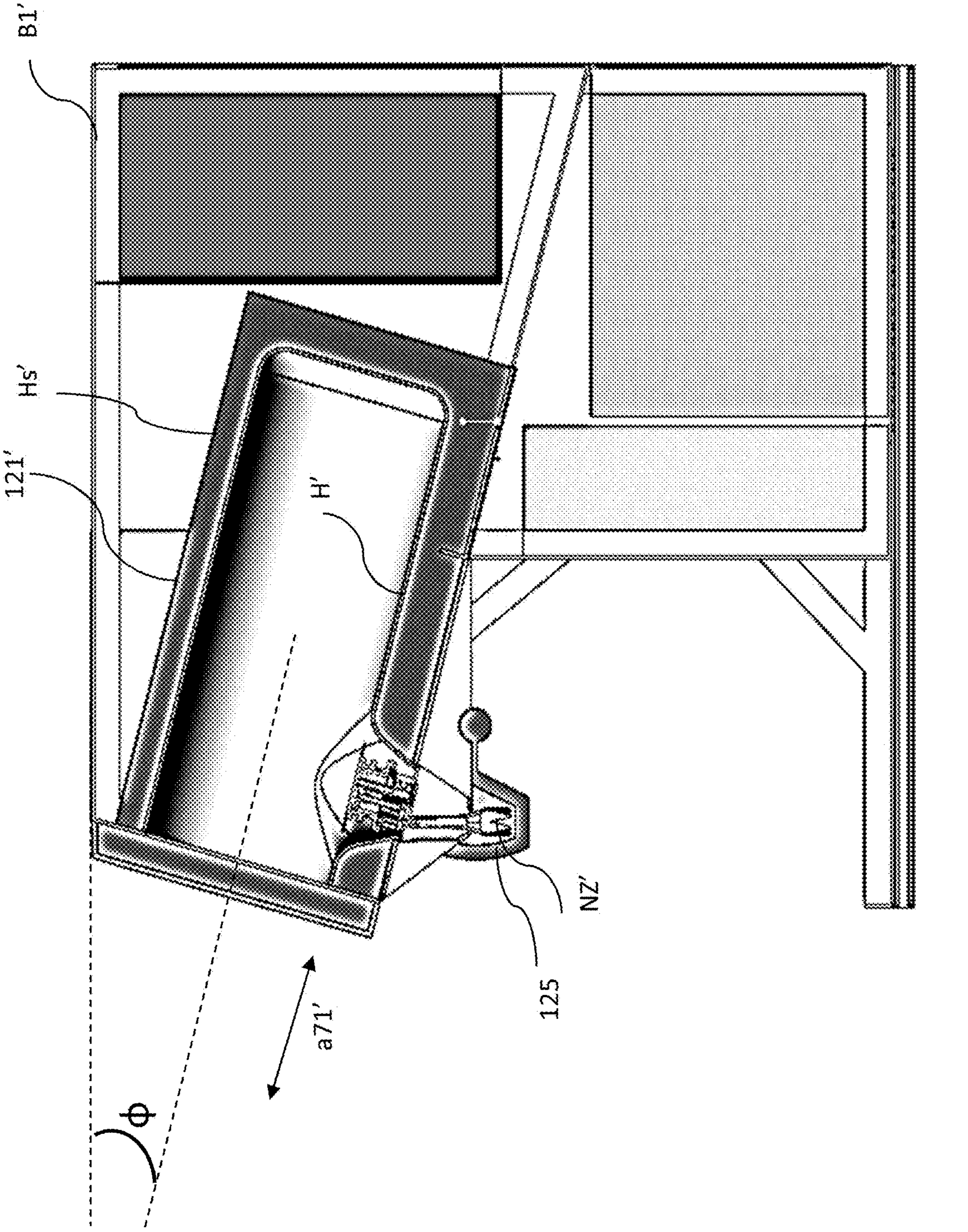
Figure 17B:
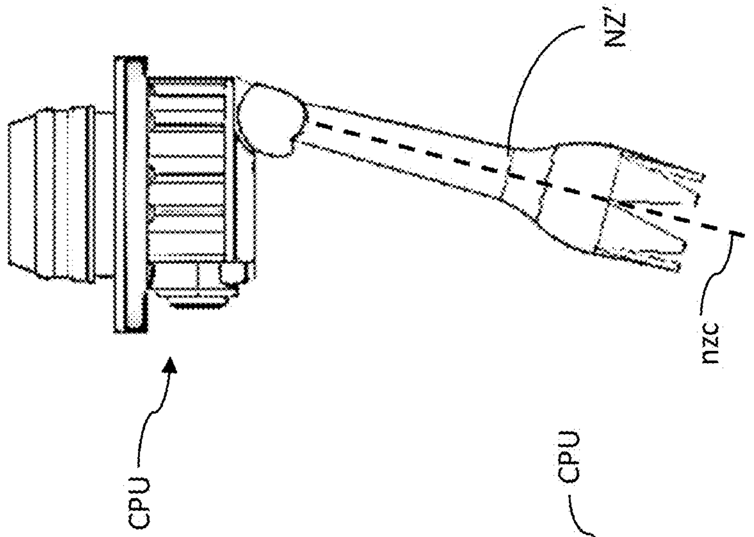
Figure 17A:
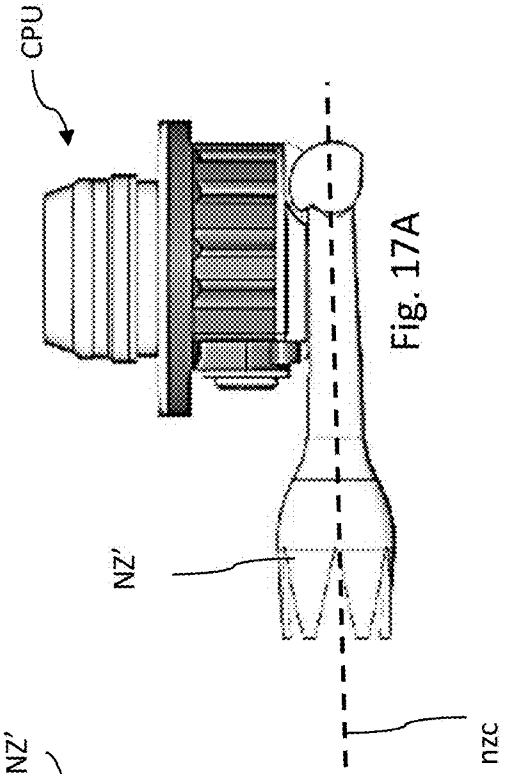
Figure 16:
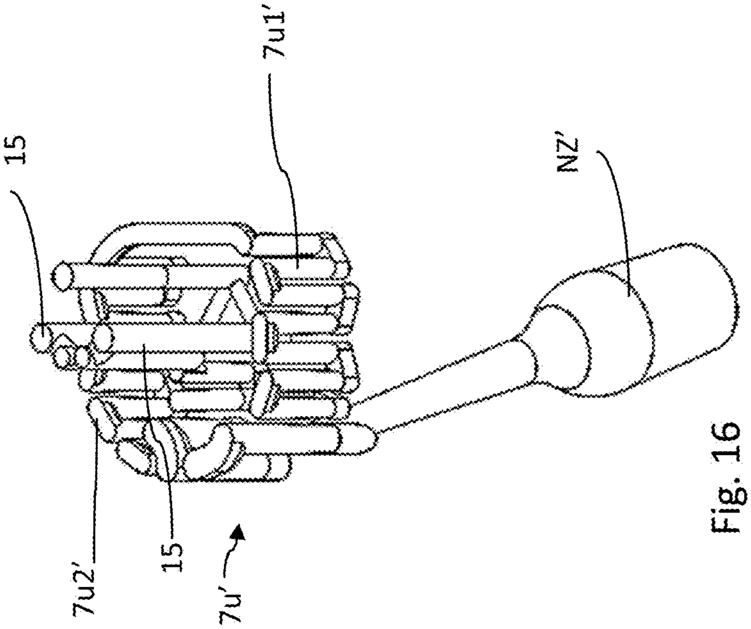

FIGS. 8A-B show perspective views of a further embodiment of the CPU, from two different viewing directions;

FIG. 9 shows a cross-sectional view of sealing means of a CPU according to an extra advantageous embodiment; and FIG. 10 shows a perspective view of a seal of the CPU of FIGS. 8A-B in more detail;

FIG. 11 shows an isometric semitransparent view of a product flow path in a CPU according to a preferred embodiment;

FIG. 12A schematically shows a top-down cross-sectional view of a shape of a CPU and a corresponding mating shape of a CPU receiving port;

FIG. 12B shows a sideways cross-sectional view over line XII-XII of FIG. 12A;

FIG. 13 show a cross section over line XIII-XIII of FIG. 3B, of a further embodiment of a container receiving space provided with a cooling channel and a movable closure member, wherein in the different figures the closure member and a respective actuator are shown in different positions;

FIG. 14 shows an opened perspective view of a CPU including a helical product processing path;

FIG. 15 is similar to FIG. 3A, showing an alternative product container orientation;

FIG. 16 shows part of an embodiment of the CPU, in perspective opened view, including an undulating product processing path;

FIG. 17A shows a side view of an example of the CPU, having a movable nozzle, when the nozzle is in a first position; and FIG. 17B is similar to FIG. 17A, showing the nozzle in a second position, for example an operational position.

In the present application, corresponding or similar features are denoted by corresponding or similar reference signs.

FIGS. 1-13 show non-limiting examples of a system for dispensing a foamed product.

Figure 1:
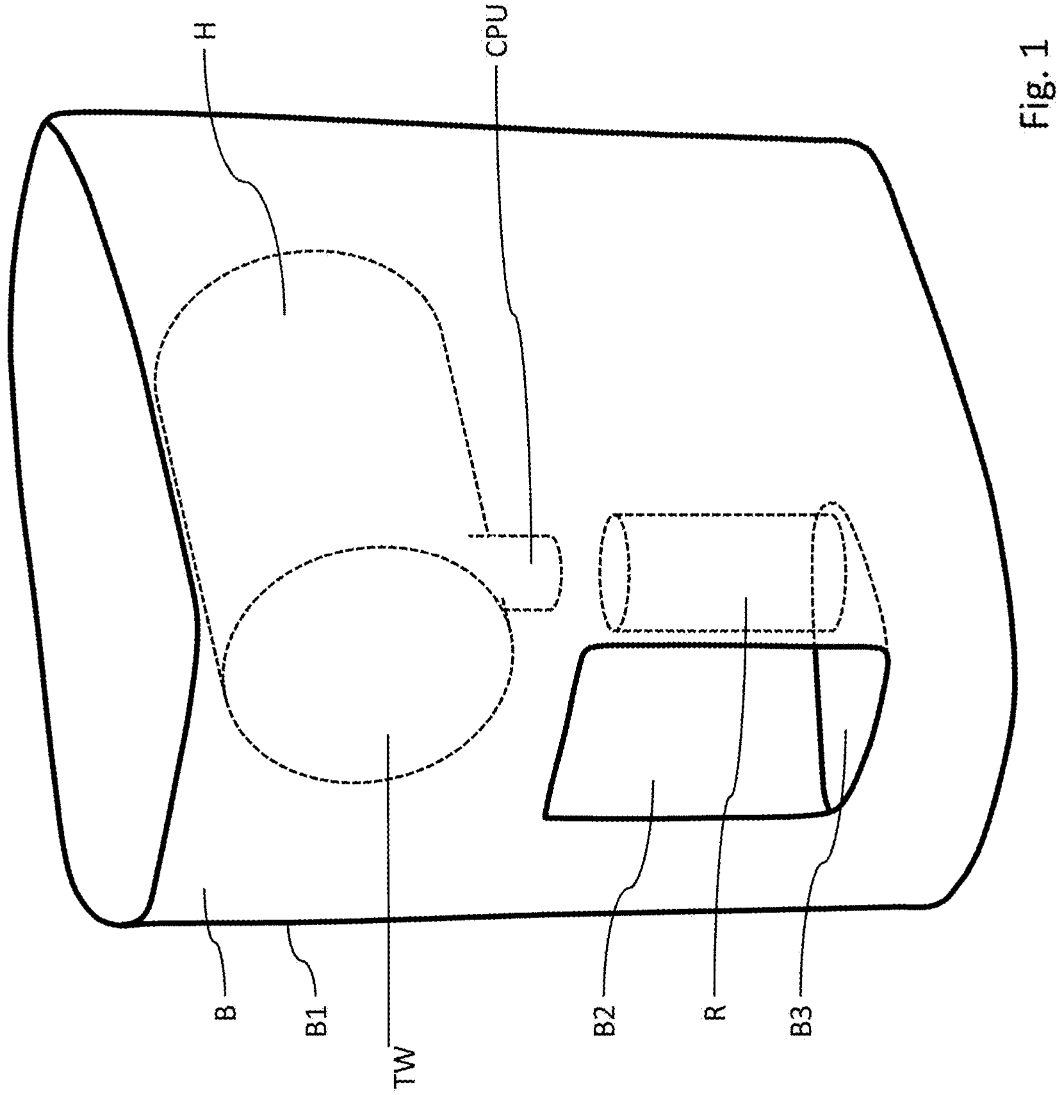

In an exemplary embodiment, as shown in FIG. 1, a foamed product dispensing system includes a product dispensing machine B, configured to receive an exchangeable product container H; a product container H, configured to cooperate with the product dispensing machine B, after placement in the machine B; wherein the product container H contains a foamable product P, preferably a food product, for example cream, wherein the product container H is provided with a product processing unit CPU including a frothing device 15 (see e.g. FIG. 5) having a product entrance 15*i* for receiving product P and a product exit 15*u* for discharging product P, wherein the processing unit CPU is connectable to a gas supply (see e.g. FIG. 4) for supplying gas to the product P.

The system is preferably configured to dispense foamed product at a predetermined overrun which is larger than 200%.

In an embodiment, the predetermined overrun is larger than 300%, for example about 400% or about 500%.

In an embodiment, the predetermined overrun is smaller than 800%, preferably smaller than 600%, for example about 400% or about 500%.

For example, the predetermined overrun can be in the range of 300%-600%, for example in the range of about 400% to about 500%.

In an embodiment, the product dispensing machine B is configured to cool the foamable product P in the received product container H, for example by cooling the received product container, in particular to maintain a temperature of the product P in the container H within a predetermined temperature range, for example a temperature range of 4 to 7° C.

In an embodiment, the product dispensing machine B comprises the gas supply, wherein the gas supply is configured to supply gas at an operational pressure in the range of 3 to 10 bar, preferably in the range of 4 to 8 bar, for example about 5.5 bar.

In an embodiment, the product container H is configured to contain, and preferably contains, a volume of foamable product P in the range of 0.5 to 10 L, preferably in the range of 1 to 5 L, for example about 2 L.

In an embodiment, the product processing unit CPU includes a product feedthrough channel PFC upstream of the frothing device 15, wherein the product feedthrough channel PFC provides a flow restriction FR with a representative transversal area in the range of 1 to 3 $mm^2$, preferably in the range of 1.2 to 2.2 $mm^2$, for example about 1.5 or 1.8 $mm^2$.

In an embodiment, the frothing device 15 is provided with one or more microfiltration walls 15*a* having gas transmissive pores, wherein the one or more microfiltration walls 15*a* separate a gas supply space 15*d* associated with the gas supply from a foaming channel 15*b* associated with the product entrance 15*i*, wherein each of the microfiltration walls 15*a* is substantially tubular, extending at a respective wall length WL along a respective main axis, wherein a sum of the respective wall lengths WL of the microfiltration walls 15*a* is in the range of 34 to 50 mm, preferably in the range of 38 to 46 mm, for example about 42 mm.

In an embodiment, the number of microfiltration walls 15*a* of the one or more microfiltration walls 15*a* is at least two, preferably two, wherein preferably one or more mutual differences in respective wall lengths WL of the at least two microfiltration walls 15*a* are smaller than 2 mm, preferably smaller than 1 mm, for example about 0 mm, wherein for example the respective wall length WL of each microfiltration wall 15*a* is about 21 mm. For example, the two (or more) microfiltration walls 15*a* can extend in parallel with each other.

In an embodiment, the product processing unit CPU comprises a processing device 7 arranged downstream of the microfiltration device 15 and configured for performing a mixing treatment and/or pressure reduction treatment of the product provided with gas, wherein the processing device 7 comprises an undulating, in particular labyrinth type, fluid path 7*u* (see FIG. 11) for the product provided with gas, said fluid path 7*u* preferably having a length of at least 30 cm, preferably at least 35 cm, more preferably at least 40 cm, for example about 40 cm or about 44.5 cm.

FIG. 11 shows the undulating fluid path 7*u* as part of a flow path 7*u*, 7*v*, 7*w* of the CPU, which flow path can be seen to extend in a flow direction from a respective input 7*i* to a respective exit 7*e* of the flow path 7*u*, 7*w*. An example having a similar undulating path 7*u*' is depicted in FIG. 16 (which also shows a possible position of a respective frothing device 15, which can e.g. be at least partly surrounded by the undulating path 7*u*, 7*u*')

In an embodiment, the undulating fluid path 7*u* has a substantially uniform transversal representative width in the range of 2.8 to 3.2 mm, for example about 2.8 mm or about 3.0 mm.

In an embodiment, the undulating fluid path 7*u* alternatingly comprises first 7*u*1 and second 7*u*2 path sections, wherein the first path sections 7*u*1 are substantially straight and extend substantially parallel to each other, wherein the second path sections 7*u*2 each extend at an angle to a direction in which the first path sections 7*u*1 extend, said angle preferably being in the range of 45 to 135 degrees, more preferably in the range of 80 to 110 degrees, for example about 90 degrees.

For example, the first path sections 7*u*1 can extend substantially in parallel with respect to the frothing device 15 (in particular with a longitudinal axis thereof), for example one or more microfiltration walls/channels 15*a* of a microfiltration device 15.

In FIG. 11, only some of the first 7*u*1 and second 7*u*2 path sections have been indicated with a respective reference sign, wherein it will be appreciated that further such first and second sections can be seen in FIG. 11.

In an embodiment, the number of first path sections 7*u*1 is in the range of 10 to 30, preferably in the range of 15 to 25, for example about 20.

In an embodiment, the total length of the first path sections 7*u*1 is at least two times larger than the total length of the second path sections 7*u*2, preferably at least four times larger, more preferably at least six times larger, more preferably at least eight times larger, for example about nine times larger.

It has been found that good dispensing results can be achieved using the undulating fluid path 7*u*. As is mentioned before, instead of the undulating fluid path 7*u*, for example, a compact CPU can include a helical fluid path 7*u*' for performing at least part of the mixing treatment and/or pressure reduction. For example, the helical path 7*u*' can be arranged at the position of the first and second path sections 7*u*1, 7*u*2 shown in FIG. 11. An example of a CPU having a helical processing path, between the microfiltration device 15 and a downstream product outlet, is shown in FIG. 14.

In an embodiment, the processing device 7 comprises a widening fluid path 7*w* (see FIG. 11) downstream of the undulating fluid path 7*u* (or alternatively the helical path), said widening fluid path gradually increasing in width along its length in the downstream direction (i.e. the flow direction from input 7*i* to exit 7*e*), in particular gradually increasing by a factor of at least two, for example about 2.3.

Such a fluid path configuration enables dispensing of foamed cream of particular good quality, e.g. having a quality which is similar or better compared to whipped cream.

In an embodiment, as shown in FIG. 11, the processing device 7 comprises a further fluid path 7*v* which connects the undulating fluid path 7*u* to the widening fluid path 7*w*. The further fluid path 7*v* can for example substantially extend in a plane in which one or more of the second path sections 7*u*2 of the undulating fluid path 7*u* extend. The further fluid path 7*v* may be a further undulating fluid path 7*v*, for example undulating less sharply and/or less frequently compared to the undulating fluid path 7*u*.

In an embodiment, the length of the (downstream) widening fluid path 7*w*, and/or a sum of respective lengths of the widening fluid path 7*w* and the further fluid path 7*v*, is in the range of 40 to 100 mm.

In an embodiment, said length of the widening fluid path 7*w*, and/or a sum of respective lengths of the widening fluid path 7*w* and the further fluid path 7*v*, is in the range of 50 to 90 mm.

In an embodiment, said length of the widening fluid path 7*w*, and/or a sum of respective lengths of the widening fluid path 7*w* and the further fluid path 7*v*, is in the range of 60 to 80 mm.

In an embodiment, said length of the widening fluid path 7*w*, and/or a sum of respective lengths of the widening fluid path 7*w* and the further fluid path 7*v*, is about 70 mm.

A product discharge channel which can e.g. form the widening fluid path 7*w* or part thereof can terminate e.g. via a product shaping nozzle NZ, e.g. having an array of product-shaping teeth or the-like (known as such, and sometimes called a 'tulip').

Figure 6B:
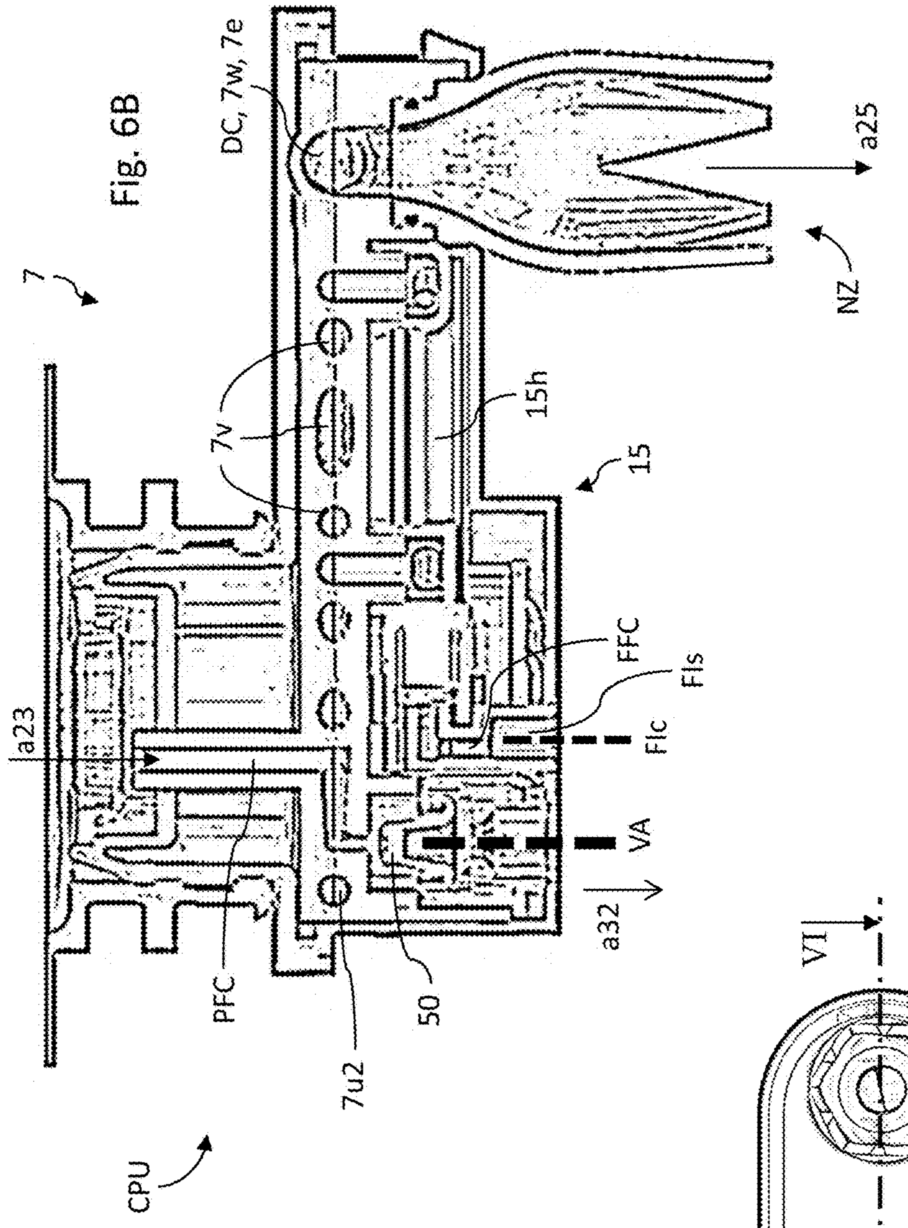
FIG. 6B shows a cross sectional side view of the CPU of FIG. 6A along the line VI-VI in FIG. 6A.

In an embodiment shown in FIG. 6B, the processing device 7, in particular the fluid path 7*u* (7*u*1, 7*u*2), 7*v*, 7*w* thereof, is substantially distributed throughout the CPU, extending in the view of FIG. 6B from one end of the CPU left of the product feedthrough channel PFC (see section 7*u*2) along and between various parts of the CPU to an opposite end of the CPU at the nozzle NZ. A relatively long fluid path 7*u*, 7*v*, 7*w* for good product processing (e.g. pressure reduction) can thus be provided in a relatively compact CPU.

In an exemplary embodiment, as shown in FIG. 1, the foamed product dispensing system includes the product dispensing machine B comprising a housing B1. In the present example the housing B1 (i.e. an external wall thereof) includes an opening B2, wherein the opening B2 provides access to a platform B3, wherein the opening B2 and platform B3 are configured for receiving a foamed product receiving receptacle R, e.g. a cup or a glass. Preferably, the opening/access is closable by a movable door D1 (depicted with a dashed line in FIG. 3B).

Figure 2:
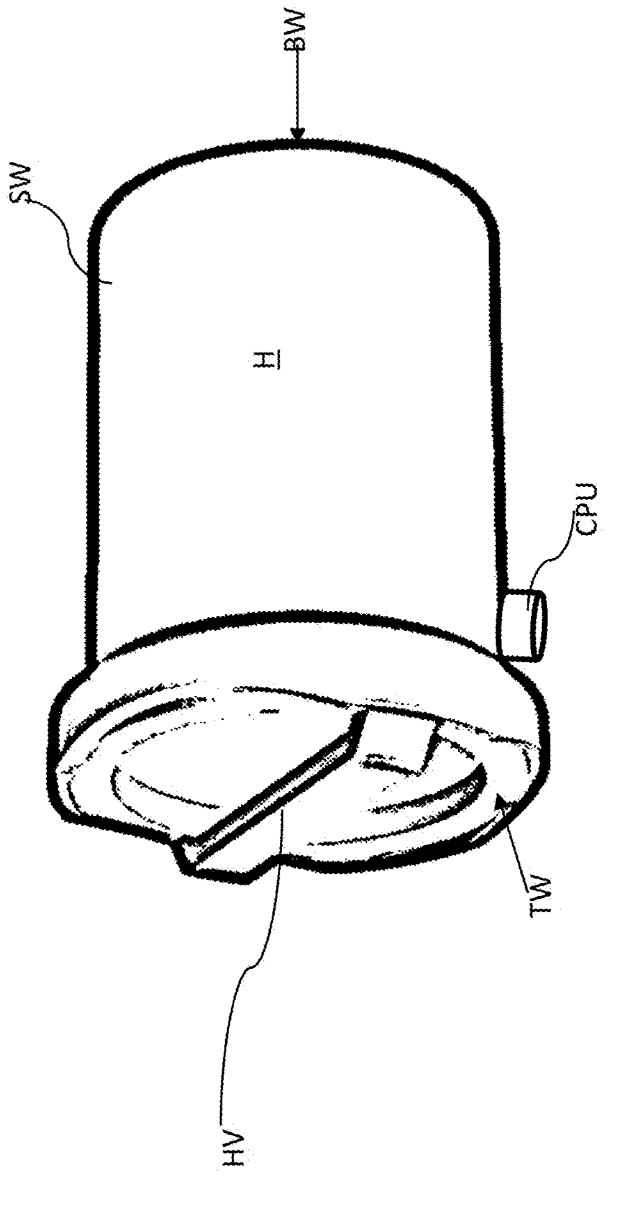
FIG. 2 shows a perspective view of a product container of the system of FIG. 1.

The exemplary system further includes the aforementioned exchangeable product container H, provided with a product processing unit CPU (see FIG. 2). The CPU may be located on several positions. In the present advantageous example, the product processing unit CPU protrudes radially outwardly from the container. In particular, it extends through an outer wall of the holder H, in particular spaced-apart from a top wall TW and a bottom wall BW of the holder H. Moreover, as follows from the drawing, in this embodiment, the CPU is located near the top of the product container H.

In the present example, the product container H is a substantially cylinder-shaped or bucket-shaped capsule, for example having a rigid (e.g. metal or steel or rigid plastic) outer wall, being configured to be pressurized, e.g. to a pressure of at least 2 bar. A preferred length L of the capsule (measured between a top wall TW and bottom wall BW in the present example) is in the range of about 20 to 40 cm, wherein an external diameter X of the capsule (i.e. a diameter of a cylinder wall extending between the top and bottom) is in the range of about 10 to 30 cm.

Moreover, as follows from the drawing, it is preferred that the capsule/container H includes a gripping element, for example a handle HV, allowing a user to lift and hold the capsule with ease. In the example, the gripping element protrudes from a top wall TW of the container H, which top wall faces forwardly towards a front of the dispensing machine after placement of the container H in the machine.

As shown in FIG. 3A, the dispensing machine B preferably comprises a container receiving space Hs (e.g. defined by or located within a respective wall structure 121) for receiving the container H. The dispensing machine preferably includes a container guide G (shown with dashed lines) for guiding the container H into and out of a container receiving space Hs of the machine (along a placement direction, indicated by an arrow a71). Preferably, the container receiving space in the housing B1 of the machine can be sealed or closed off from an environment of the housing, in particular allowing improved temperature control of the product container after loading. For example, the housing B1, and/or the afore-mentioned wall structure 121, may include a movable cover D2, e.g. a door for controlling access to the container receiving space Hs.

As indicated by arrow a71, the container H is preferably horizontally removable from the container receiving space Hs, e.g. for exchanging an emptied container with a filled container. Said container guide G can assist an operator in stably moving the container H towards a final position into the machine, and in the removing of a used-up container.

FIG. 15 shows an alternative container orientation, after loading (in the respective receiving space Hs', configured for receiving and holding the container H' at the slanted orientation). In this case, a central (longitudinal) axis of the container H' extends at an angle with respect to a horizonal plane, in particular an angle φ smaller than 45 degrees and preferably smaller than 30 degrees. For example, the angle φ can be in the range of about 10-30 degrees. In this case, the container H' can be removable from the container receiving space Hs', along a respective oblique direction a71'. The respective slanted orientation, wherein a distal end of the container (i.e. a container bottom) is preferably located lower than a proximal section (near the CPU) allows for efficient user-friendly handling of a filled container during loading.

With particular reference to FIG. 3B, the machine can be configured such that placement of the container H in the container receiving space Hs causes one or more connectors of the machine B to connect to respective connectors of the container H. For example, container placement can cause a pressurizing fluid output connector FO of the machine B to be automatically connected to a fluid input connector Hi of the container H (for pressurizing an interior of the container). As a further example, such placement can cause a fluid injector connector FIc of the machine B to be connected to a fluid injector socket FIs of a product processing unit CPU of the container H, as will be explained in more detail below.

It should be observed that operation of the system shown in FIG. 15 can follow that of the FIG. 3B example. The respective container H' can be configured in various ways, and can e.g. be a BIB (Bag in Box)-type container, for example a container that encloses a pressure space that includes a flexible bag FB filled with product P (see also FIG. 3B), wherein during operation of the machine B, the container H' is pressurized by the dispensing machine by a gas, e.g. air, being by the machine pumped through a fluid input causing the interior of the container H' to become pressurized at a super-atmospheric pressure. The CPU can be connected to or integrated with the flexible bag FB, as will be explained below.

A removing of a container H from the machine can cause the one or more connectors of the machine B to become disconnected from the respective connectors of the container H. The machine B and/or the container H may include means for securing the container H in the container receiving space Hs, in order to prevent accidental and/or unauthorized removal of the container H from the container receiving space Hs, as will be appreciated by the skilled person.

The container H, in particular a product holding space (interior space, reservoir) thereof, can be filled with various types of product.

The product comprises, in particular, a food, for instance, a product safe for human consumption. The product comprises, for instance, one or more of: cream, spray cream, or a dessert (for instance, a mousse forming product). The product can comprise a dairy product or a milk product, for instance, cream or milk.

According to an advantageous elaboration, the product P present in the container H is a homogeneously foamable product, and in particular a food product, cream, spray cream, (milk) shake, milk, ice cream or dessert, more particularly a dairy product or milk product. The product P can be, for instance, cream. The product P can optionally contain, for instance, a propellant or blowing agent (for instance, in a condition at least partly dissolved in the product), in particular a propellant consisting of one or more of: air, $N_2$ and/or $N_2O$. Such a propellant or blowing agent is, in particular, safe with regard to food technology. The propellant or blowing agent can hold the inner space 4, for instance, at a particular super-atmospheric prepressure. Preferably, the product P does not contain a blowing agent.

In FIG. 3B, an example of the container H is shown in more detail, containing a quantity of product P held in a flexible bag FB within the container H. During operation of the machine B, the container H is pressurized by the dispensing machine by a gas, e.g. air, being by the machine pumped through the fluid input Hi (as indicated by arrow a21), causing the interior of the container H to become pressurized at a super-atmospheric pressure. Consequently, pressure is exerted on the flexible product bag FB, as illustrated by arrows a22. The pressure, possibly in combination with gravity, causes the product P to flow (indicated by arrow a23) from the flexible bag FB into the downstream product processing unit CPU, that is, in case a valve or seal of the product processing unit CPU is brought to an operational state providing a product flow connection towards a respective product processing space (as will be explained below), discharging foamed product via a respective outlet (indicated by arrow a25).

The flexible bag FB as such can have various configurations and shapes. For example the bag can be made of one or more flexible layers of one or more plastic or plastic substances, and/or of one or more flexible layers of paper or paper substances, and/or one or more flexible layers of metal or metal substances (e.g. aluminium). The flexible bag can be entirely flexible but that is not required. It can e.g. include or more foldable bag sides that fold inwardly during product discharge. In particular, the flexible bag FB is configured to allow a bag volume decrease during discharging product from the bag FB.

In yet a further embodiment, the product processing unit CPU and the flexible bag FB are integrally joined with each other (into an assembly). For example, a top wall or top section of the product processing unit CPU can be made in one piece, or welded or glued to, the flexible bag, or joined to the bag FB in another manner. The assembly of the product processing unit CPU and bag FB can be removably held by an outer part SW (shell) of the container H. For example referring to FIG. 2, the top wall TW of the container may be a removable, at least hingeable, cover, that can hermetically seal the interior of the container H (in a gastight manner) when the cover wall TW is in the depicted closed position (e.g. located on top of a side wall SW). The top wall TW can be removed from a remaining container part SW, wherein optionally the top wall TW and remaining container part SW can remain connected at a connecting hinge, allowing access to the flexible bag FB that is located in the container H. Then, preferably, the flexible bag FB and its processing unit CPU can be removed from the container (e.g. after use, e.g. when the bag is empty), to be replaced with a fresh product containing flexible bag and respective processing unit CPU. After the new filled flexible bag FB and CPU have been properly positioned within the container shell, the top wall TW can be installed again for hermetically sealing the container again (allowing pressurization of the container interior and respective flexible bag FB). In this embodiment, in particular, the exterior SW of the container H can act as a bag positioning structure, for installing and holding a flexible bag (and its CPU) in a desired operation position within the machine B. The container shell (i.e. the outer wall SW of the container) itself can be made of a rigid material. A single container shell SW can be used to subsequently operate with a number of replaceable flexible bag-CPU assemblies. This also leads to advantages concerning transport and storage, since a relatively large number of flexible product container bags FB can be transported and/or stored in a relatively small transport resp. storage space (whereas transporting a large number of rigid outer container shells can require more space).

In an embodiment, the filled flexible bag FB is fixed to its container H, forming a Bag-in-Box (BIB) structure, to be exchangeably held by the machine.

In an embodiment, a container H that includes a flexible bag FB (as in the above example), wherein the exterior walls TW, SW of the container H act as a bag pressurization chamber, is entirely removable from the machine B.

In an alternative embodiment, only the flexible bag-CPU-assembly is removable from the machine B, e.g. when the container H has been opened by removing, at least hinging, the lid/cover wall TW, leaving an outer part SW of the container in the machine B during the exchange of the bag. In such an embodiment, the flexible bag-CPU-assembly as such can be called the "exchangeable product container", to be placed in a pressurization chamber of the machine B. In yet another embodiment of the invention, the product container as such can have a fully or at least partly flexible outer wall, the product container being placed in a dedicated pressurization chamber of the machine B during operation.

It will be appreciated that the system can be configured in various alternative ways. For example, an alternative, having a corresponding housing B1' that has a wall structure 121' for providing a slanted container receiving space Hs', to hold the container H' in a slanted orientation, is depicted in FIG. 15.

FIG. 3B further shows the machine B to include an optional air dryer AD for supplying dried air, e.g. dried ambient air.

The air dryer AD may be embedded in or forming part of a cooling system CS of the machine B, for example a cooling system CS configured to cool the product container H as well. During operation, the dried air is preferably received from the air dryer AD by a fluid injector FI, which is configured to supply the dried air into the product processing unit CPU via a fluid injector connector FIc (indicated by arrow a24). During use the supplied air flows into a fluid feedthrough channel FFC of the CPU, see arrow a31 in FIG. 5.

Optionally, the fluid injector connector FIc can be integrated with or form part of a valve actuator VA (see FIG. 3B) of the dispensing machine. The valve actuator VA is then configured to actuate a valve member 50 of the product processing unit CPU through actuation, e.g. rotary and/or translational actuation, of the fluid injector connector FIc. A respective valve actuator can be configured in various ways and may include a servo motor, electromotor, electromagnetic actuator or other drive means.

Figure 5:
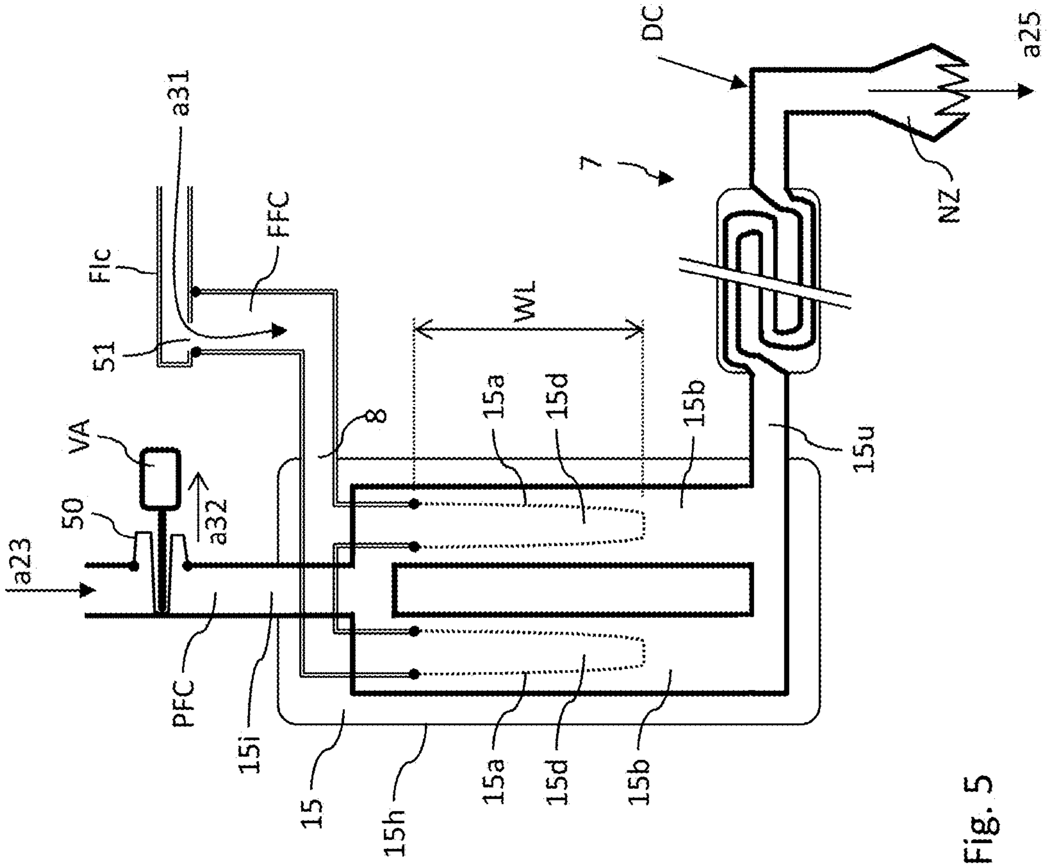
FIG. 5 shows a diagram of flow paths of the system of FIGS. 1-3B.

Alternatively, as shown in FIGS. 5 and 6B, the valve actuator VA can be provided substantially separate from the fluid injector connector FIc, wherein for example a separate actuator is provided for actuating the fluid injector connector, or wherein for example the system is configured such that placement of a product container H automatically connects the CPU to the fluid injector. FIG. 6B schematically shows mutually different connection positions of the valve actuator VA and the fluid injector connector FIc in a cross sectional side view of an exemplary CPU.

With further reference to FIG. 3B (see also FIG. 5), the product processing unit CPU is configured to mix the product P with the dried air as they are being supplied to the product processing unit CPU, resulting in a foamed product being discharged from the product processing unit CPU, as indicated by arrow a25. A product discharge channel DC of the CPU, which channel can e.g. form the widening fluid path 7*w* or part thereof, can terminate e.g. via a product shaping nozzle NZ, e.g. having an array of product-shaping teeth or the-like (known as such, and sometimes called a 'tulip'). During use, a receptacle R, e.g. a dish, bowl, glass or cup, may be exchangeably placed near, e.g. under, the product processing unit CPU— onto the respective platform B3—for receiving the discharged foamed product.

The machine B may be provided with a control unit CU being configured for controlling fluid flow and product flow to the processing unit CPU, for example by controlling activation and deactivation of fluid flow means (e.g. a pump, servo, motor etc.). Further, the control unit CU can be configured for controlling a position of the CPU valve member 50 through the respective valve actuator VA. Preferably, in case of initiating a product discharge, the control unit is configured to start fluid flow before product flow. The control unit is preferably at least partly user operable via a user interface or operating device (not shown) of the machine B, e.g. via a touch display, control knob, switch or the-like.

Figure 3C:
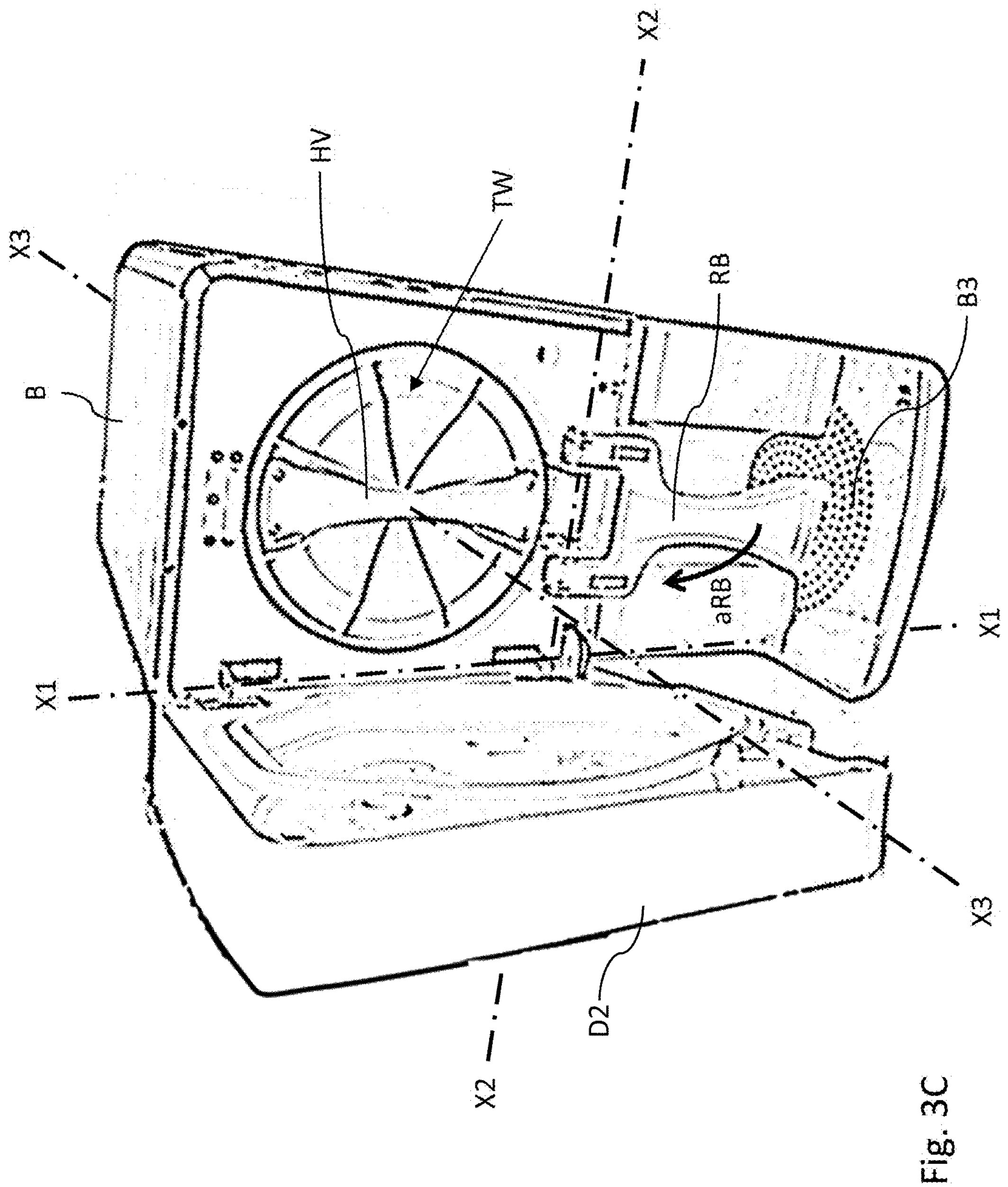
FIG. 3C shows a perspective view of an exemplary foamed product dispensing system according to an embodiment.

FIG. 3C shows a perspective view of an exemplary foamed product dispensing system according to an embodiment which may be combined with one or more of the other embodiments. In FIG. 3C, a product dispensing machine B is shown wherein the housing B1 is provided with a door D2, e.g. a front door, which is rotatable, in particular hingeable, about an axis X1 between an opened position (shown) and a closed position, wherein in the closed position the door D2 may substantially form a front part of the dispensing machine B. The door D2 may e.g. provide elements of a user interface of the machine B. In FIG. 3C, the door D2 is shown in an opened position, exposing a top wall TW of an exchangeable or non-exchangeable capsule SW (see FIG. 2), which top wall TW comprises a handle HW for handling the top wall TW and/or the capsule SW. Such a capsule SW is preferably configured to exchangeably receive the product container FB therein and to be pressurized by the machine B for thus pressurizing an inserted product container FB.

The top wall TW (e.g. a lid, in particular a hingeable lid, e.g. hingeable about a hinging axis which at least in an operational state of the capsule SW extends substantially parallel to axis X2 in FIG. 3C) and/or the capsule SW is preferably provided with a plurality of (e.g. six) closing members, e.g. respective closing members, e.g. bayonet closing members. In this way a user may be enabled to open and close the top wall TW with respect to the capsule SW, in particular close such that a substantially pressure tight seal is formed between the top wall TW and the capsule SW. For example, to close the top wall TW, the user may thus rotate the top wall TW with respect to the capsule, substantially about the axis X3, e.g. by about 15 degrees, thereby engaging said mutual closing members with respect to each other.

The product dispensing machine B is preferably configured to enable a pressurization of the capsule SW depending on a position and/or orientation of the capsule SW relative to the machine B. The machine B preferably prevents that the capsule SW is pressurized while having an undesired, e.g. unsafe, position and/or orientation relative to the machine B.

Such an unsafe position and/or orientation of the capsule SW, e.g. of the top wall TW, may for example result from an incomplete rotation of by a user of the top wall TW with respect to the capsule SW, e.g. incomplete with respect to a target rotation of 15 degrees as explained above.

In the embodiment shown in FIG. 3C, this position and/or orientation dependent enabling of pressurization is realized by a combination of features explained hereafter, while it will be appreciated that alternative embodiments may lack one or more of those features.

FIG. 3C shows the machine B as comprising a retaining member RB which is movable from a releasing position (shown in FIG. 3C) to a retaining position (not shown), in particular by rotating the retaining member RB about axis X2 in the direction of arrow aRB. In the retaining position, the retaining member may be substantially aligned with the handle HV of (the top wall TW of) the capsule SW. FIG. 3C shows the capsule SW and its top wall TW in a correct, desired operational position. In the system shown in FIG. 3C, a different, i.e. incorrect, placement (e.g. position and/or orientation) of the capsule SW, in particular the handle HV, would result in the retaining member RB being blocked (in particular by the handle HV) from entering, at least fully entering, its retaining position. For example, when compared to the position and orientation shown in FIG. 3C, the capsule SW (including handle HV) would be translated along and/or rotated about the axis X3, thus into an undesired position and/or orientation, this would result in an at least partial blocking of the retaining member RB as described. It will be appreciated that in this scenario, with continuing reference to FIG. 3C, the capsule SW may be translatable out of the machine B along axis X3 but not further into the machine B, e.g. due to a corresponding configuration, e.g. dimensioning, of the machine B.

While FIG. 3C shows the retaining member RB substantially in the form of a retaining bar RB, it will be appreciated that many alternative shapes are possible. As one such an alternative (not shown), the retaining member RB may be formed as or as part of a door, e.g. a front door similar to the door D2.

As can be seen in FIG. 3C, when the retaining member RB is not in the retaining position, e.g. when it is in the releasing position, the retaining member RB may substantially block the door D2 from moving to its closed position. The machine B is preferably configured to detect when the door D2 is in the closed position and to enable a pressurization of the capsule SW only when the door D2 is detected as being in the closed position. In this way, for example, the machine B can be configured to enable a pressurization of the capsule SW depending on a position and/or orientation, in particular a desired and/or safe position and orientation, relative to the machine B.

Thus, with reference to FIG. 3C, starting e.g. from an operational state of the system, the following steps may be carried out for exchanging the capsule SW while helping to prevent unsafe pressurization of the capsule by the machine B: a user opens the door D2 (rotating the door D2 about axis X1) to expose the retaining member RB; the user moves the retaining member RB from its retaining position to a releasing position (about axis X2, in opposite direction compared to arrow aRB in FIG. 3C); using the thus exposed handle HV, the user translates (and possibly rotates) the capsule SW with respect to the machine B, in particular along (and possibly about) axis X3; using the handle HV, the user opens the capsule SW to enable exchanging of a product container FB (e.g. replacing an empty container by a full container), whereafter the capsule SW is closed again; the user replaces the capsule SW in the machine B; the user moves the retaining member RB back to its retaining position; the user closes the door D2; the machine B detects that the door is closed; and the machine starts to pressurize the capsule SW in response to the detecting. It will be appreciated that the machine B may advantageously be configured to perform further checks prior starting pressurization, so that pressurization may not always necessarily start (merely, directly) in response to said detecting. For example, the machine B may be configured to check if a measured cleaning time interval of a closure member 123. As another example, the start of pressurization may be (additionally) conditioned on a detection that a current pressure at the capsule SW is below a respective target pressure.

It will be appreciated that in some embodiments the machine B can be configured without such a retaining member RB.

It will be clear from the above that thus in the alternative case of an incorrect placement of the capsule SW, the door D2 would not be closeable so that the machine would subsequently not attempt to pressurize the capsule SW.

It will be appreciated that in some embodiments, for example, only the top wall TW of the capsule SW may be removable from (or at least openable, e.g. hingeable, with respect to) the machine B, whereas other parts of the capsule SW may be substantially fixed in the machine B.

Figure 6A:
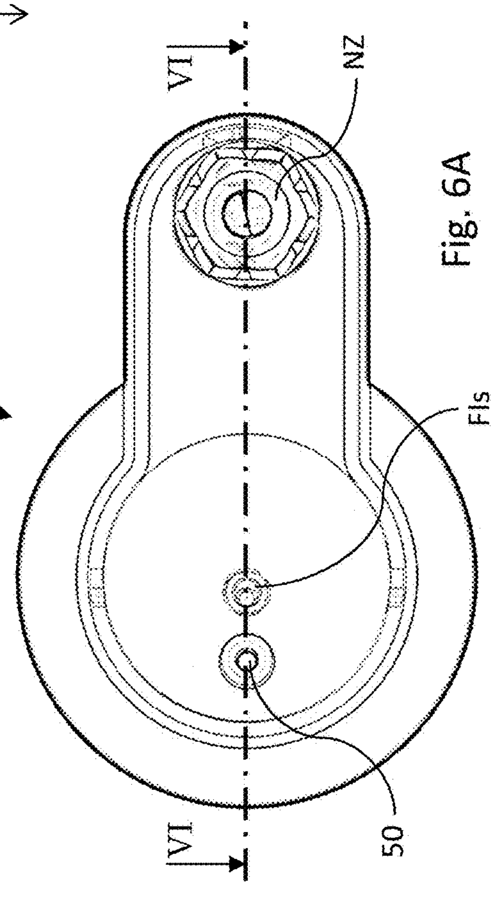
FIG. 6A shows a bottom view of an embodiment of the CPU of the product container of the systems of FIGS. 1-3C.

FIGS. 6A-B depict a particularly compact embodiment of the product processing unit CPU of the system, in more detail.

In FIG. 6B, connection positions of the valve actuator VA and fluid injector connector FIc (here separate from each other) have been indicated schematically by dashed lines. In this example the valve member 50 is formed as a flexible organ with a substantially conical mid-section which can be actuated with respect to a sealed peripheral edge of the valve member 50 by the valve actuator VA (e.g. in the form of an actuated rod or the-like extending into a socket formed by the conical mid-section). A periphery of the valve member 50 is configured to remain fixedly sealed to a housing of the CPU. In this way product hygiene is maintained at the valve member 50 while flow of product can be well regulated using the valve actuator VA (which thus does not come into contact with the product).

In the view of FIG. 6B, during use, when the valve actuator VA pushes the valve member 50 upward, the product feedthrough channel PFC is restricted and ultimately closed off. When the valve actuator VA is subsequently retracted or released, the valve member 50 (at least a mid-section thereof) moves back down. The moving back down of the valve member 50 can e.g. be under influence of pressurized product in the product feedthrough channel PFC, under influence of gravity, under influence of resiliency of the valve member 50, and/or under influence of frictional contact or the like by the retracting valve actuator VA. An e.g. annular part of the housing of the CPU is configured to engage a peripheral section of the valve member 50 to inhibit that the flexible valve member moves further down (in the view of FIG. 6B) beyond an opened position from the closed position.

FIGS. 7A-B and 8A-B depict an alternative product processing unit CPU of the system, in more detail.

As follows from the drawings the CPU is part of the afore-mentioned product container H, and is connected to the interior of the flexible bag for receiving product therefrom (as in FIG. 3B). FIG. 5 shows the CPU in a more schematic way, indicating product and fluid (gas) flows during product discharge as well.

The unit CPU is configured to receive a flow of product P into a product feedthrough channel PFC as indicated by arrow a23 in FIGS. 5 and 6B. The product feedthrough channel PFC is preferably closeable by a valve member 50. FIG. 5 shows the valve member 50 in a closed state, blocking flow through the product feedthrough channel PFC. The opened position of the optional valve member 50 is reached when the valve member 50 is moved in the direction of arrow a32 in FIG. 5. FIG. 6B shows the valve member 50 in such an opened position. The valve member 50 is not depicted in FIGS. 7A-B.

The processing unit CPU is further configured to receive fluid, e.g. dried air, into a fluid feedthrough channel FFC, e.g. from a fluid injector FI through a fluid injector connector FIc.

Figure 7B:
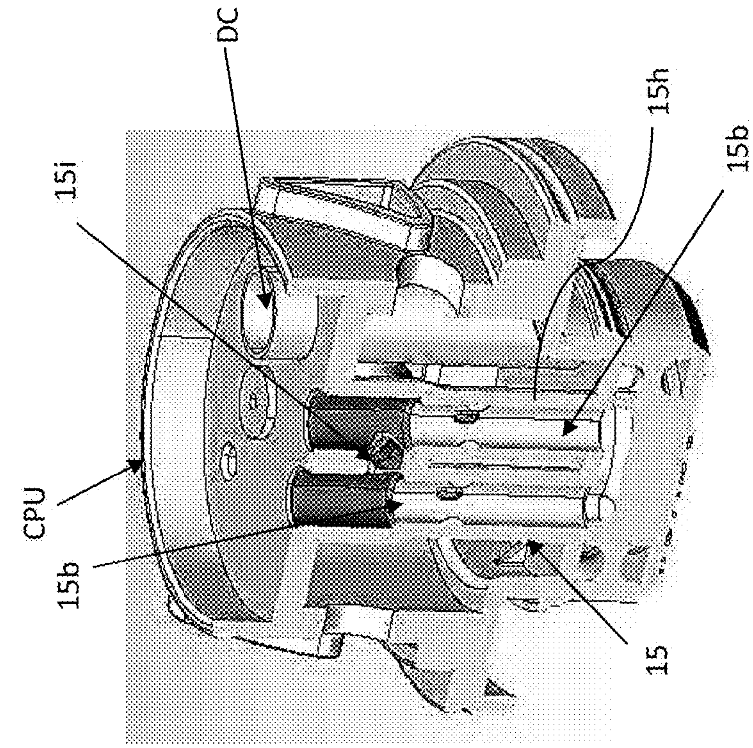
FIG. 7B shows a perspective view of first vertical cross-section of the CPU shown in FIG. 7A, taken along centre lines of the two foaming chambers.
Figure 7A:
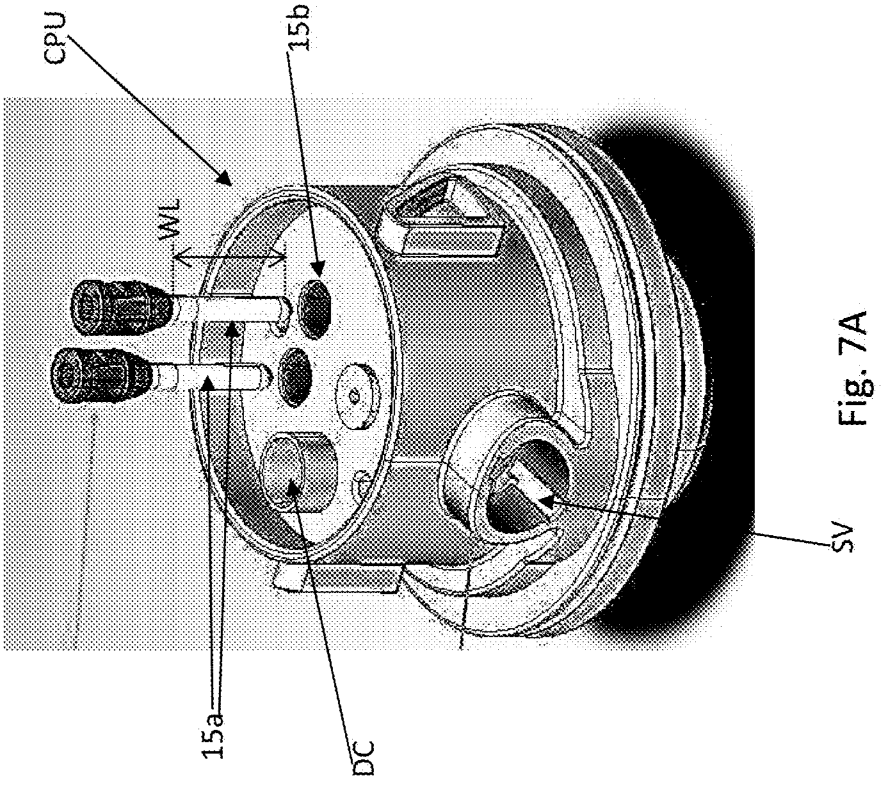
FIG. 7A shows a partly opened perspective upside-down view of an alternative embodiment of the CPU of the product container of the system of FIGS. 1-3C, wherein the microfiltration elements are shown exploded from two respective foaming chambers.

FIGS. 7A-B shows the product processing unit CPU (in a perspective, partly opened upside-down view) comprising a frothing device 15, for example a microfiltration device 15. A housing 15*h* of the microfiltration device 15 can be an integral part of the CPU (as in the embodiment shown in FIG. 6B), and it can comprise a product entrance 15*i* connected to the product feedthrough channel PFC, downstream of the valve member 50, and a gas inlet 8 connected to the fluid feedthrough channel FFC. The microfiltration device 15 further comprises at least one filtration wall 15*a* (two, in this example) having gas transmissive pores, for instance, a tubular wall, which separates a respective gas supply space 15*d* associated with the gas inlet 8 from a foaming channel 15*b*. Preferably, the length, measured in a product flow direction, of the foaming channel 15*b* is approximately 2 or 3 cm. Preferably, the gas transmissive pores of the filtration wall 15*a* have a pore size of between 0.2 and 1.5 microns.

It has been observed that good results can be achieved e.g. with a pore size of about 0.2 microns. According to an embodiment, the sizes of individual pores may vary within a certain range, for example from below 0.1 microns to above 20 microns. Alternatively or additionally, pore sizes in the range of 5 microns to 10 microns can provide good foaming properties.

In some embodiments, but not necessarily in all embodiments, good results have been achieved in case the microfiltration wall, in particular a product facing side of the microfiltration wall, includes a hydrophobic and/or oleophobic material, e.g. PTFE and/or hexafluoropropylene, to prevent or reduce clogging of the microfiltration wall by product entering or adhering to the pores.

In the present drawings, the microfiltration device 15 comprises two tubular filtration walls 15*a*, each providing respective gas supply spaces 15*d* and foaming channels 15*b* in the housing 15*h*. The tubular filtration walls 15*a* are shown exploded from the housing in FIG. 7A, and are not depicted in FIG. 7B. Each of the tubular filtration walls 15*a* preferably has a proximal gas inlet (connected to the fluid feed-through channel) and has preferably been closed off at a distal end, as in this example. It follows that the CPU is designed such that said fluid feed-through channel FFC terminates into each of the tubular filtration elements 15*a* (as in FIG. 5), to feed the interiors 15*d* of the tubes 15*a* with gas (e.g. dry air), to be mixed into the product. The number and dimensions of filtration walls 15*a*, gas supply spaces 15*d* and foaming channels 15*b* may be implemented according to general knowledge depending on material properties, required flow rates and/or other variables.

In the microfiltration device 15 of FIG. 6B, two substantially tubular microfiltration walls 15*a* (not shown in FIG. 6B) extend substantially horizontally (i.e. left to right in the view of FIG. 6B) inside a corresponding housing 15*h*. Such a configuration further enables a compact CPU, in particular with a relatively small height.

In an embodiment, the system includes a choked gas supply (e.g. at and/or upstream of the fluid injector FI) for supplying gas at a substantially constant flow rate to the processing unit CPU during operation. In particular, as will be explained below (see FIG. 4), the choked gas supply can include a flow constriction 89, wherein a relatively high gas pressure is applied upstream of the flow constriction (e.g. a pressure higher than 5 bar), the configuration being such that a constant gas flow rate (in particular mass flow) can be obtained downstream of the flow constriction. In particular, during operation, a resulting choked flow exit velocity of the gas at the constriction 89 can be at or near sonic conditions, i.e., at or near a Mach number of 1. By application of a choked gas supply, clogging of components of the downstream frothing device (e.g. of said microfiltration device) can be prevented or reduced, and even if such clogging would occur, negative effects of such clogging can be efficiently suppressed. For example, the choked gas supply may be configured to produce a resulting gas pressure in the frothing device in the range of 1.5 to 6 bar, preferably in the range of 2.7 to 5.5 bar. During a certain operational period (in particular a period of foaming and discharge a relatively large amount of the product), the resulting gas pressure in the frothing device may gradually increase within a said pressure range, e.g. depending on an increased resistance due to filtration wall clogging.

FIG. 5 further shows the product processing unit CPU comprising a processing device 7, arranged downstream of the microfiltration device 15, for performing a mixing treatment and/or pressure reduction treatment of the product provided with gas. The processing device 7 is preferably configured to cause a controlled pressure reduction, to a pressure that is close to or is atmospheric pressure. Preferably, the processing device 7 comprises a labyrinth type fluid path being long, e.g. approximately at least 35 cm or at least 40 cm, and/or narrow and/or curved, at least compared to other fluid paths of the processing unit CPU, e.g. compared to the at least one foaming channel 15*b*. Downstream of the processing device 7 and/or as part thereof, the processing unit CPU includes a discharge channel/opening DC for discharging the product provided with gas, for example along the direction of arrow a25, via a nozzle NZ. Further details about the processing device 7 are provided elsewhere in this description with reference to FIG. 11. Referring to examples shown in FIGS. 15-17, a nozzle Nz' can be applied having a relatively long stem, in which case at least part of said discharge channel can optionally provided by such a nozzle stem.

The present CPU includes a socket/seat SV (see FIG. 7A) for receiving the valve member 50 and/or a valve actuator VA.

Since the product valve member 50 can be part of the replaceable product container, contamination of the dispensing machine itself (with product) can be prevented. The valve actuator of the dispensing machine simply connects to the CPU of the installed product container H, to control product flow and also to inject the gas (for example dried air) into the CPU for foaming the product via the respective microfiltration device. Moreover, the dispensing machine can automatically pressurize the content/interior of the product holder after the container has been loaded into the machine, for maintaining the flexible bag at a certain pressure, allowing for a swift start of a product dispensing run. Once a product container has become empty or has to be replaced or discarded, the product container can be removed from the machine, wherein the product valve member 50 releases from the machine actuator, preferably remaining in its closed valve state, preventing further chance of contamination.

Moreover, by providing the microfiltration device with two tubular filtration walls 15*a*, operating in parallel, a good, controlled food product foaming—at a relatively high throughput—can be achieved using compact means. In particular, in this way, application of a relatively long tubular filtration wall can be prevented, allowing form more precise control of the foaming process with a relatively low chance of channel clogging.

For food safety purposes, depending on the specific product being contained in the container, it may be beneficial to prevent contamination of the CPU and/or the product in the product container before use, e.g. during transport and handling. In particular, it may be required that contact between the product and ambient air be prevented during those times. It may also be required that the interior spaces of the CPU are sealed off from ambient air to prevent e.g. condensate forming in those spaces with associated hygiene issues. In view of this, the CPU may be provided with sealing means for blocking ambient air from entering the CPU and/or from coming in contact with the product.

In particular, in an embodiment which may be carried out independently from the other embodiments, a downstream section of the CPU may be provided with an airtight sealing cap. In particular, the product processing unit CPU can be provided with an airtight sealing cap 71 (see FIGS. 8A-B) configured to seal a downstream product discharge area 128 of the product processing unit CPU from an environment, before initial use. For example, the downstream discharge nozzle NZ may be located within the sealed downstream product discharge area 128 (see FIG. 12).

The sealing cap can be configured in various ways. As shown in FIGS. 8A-B, the sealing cap may e.g. include a first section 71 and an optional second section 74 that is linked to the first section, e.g. via a (film) hinge 73, wherein preferably at least one or both of the sections is/are provided with a gripping element, e.g. a handle 72. Said optional hinge 73 may be, for example, an integral (one-piece) flexible section of the sealing cap.

In this example, the first cap section 71 is configured to seal off the downstream area 128 and can cooperate with an opposite rim of the CPU to form the respective airtight seal.

Further, in this example, the second cap section 74 may be configured to seal off a second external opening of the CPU, the second opening being a gas supply opening of the gas supply FIs (see FIG. 5).

The sealing cap may be configured to be removed by a user at or around at time when the product container is inserted into the dispensing machine: first the handle is pulled to rotate the first section about the hinge and to release the first section from the CPU; then the sealing cap is pulled further to release the second section from the CPU.

In this example, a single cap includes both sections 71, 74 for sealing two different external openings of the CPU. Alternatively, the cap sections 71, 74 can be separate cap sections (that are not directly linked to each other).

In another embodiment, which may be carried out independently from other embodiments but may also be combined, the CPU may be provided with an airtight (e.g. pressure controlled) seal 61, 62 at an interface between the CPU, in particular the entrance of the afore-mentioned product feedthrough channel PFC, near or adjacent to the interior product containing space of the product container H. In this example, in a closed state, the seal is generally in direct contact with the contents of the product containing space, i.e. for example the product, preventing entry of product into the CPU and in particular preventing entry of e.g. air or gas from the CPU into the product that is held in the interior space of the container H.

As shown in FIGS. 8B, 9 and 10, in this example the seal is a pressure controlled seal that includes a ring 61 and a cap 62, wherein, in a closed state (as shown in FIGS. 8B and 9), the ring and the cap form an airtight seal, and, in an opened state (as shown in FIG. 10) a passage for product flow is provided between the ring and the cap as indicated by arrow a61. Since the location of the pressure controlled seal may be hard to access for a user and since hygienic operation of the seal is desired, the pressure controlled seal is preferably configured to open under a pressure exerted by contents of the product container when the product container is pressurized. Thus, opening of the pressure controlled seal is controlled by controlling a pressurization of the product container. The ring and the cap are preferably configured so that the cap breaks away from the ring at a predetermined super-atmospheric opening pressure or opening pressure range. In order to prevent that the broken-away cap should block a product flow into the product feedthrough channel PFC, the CPU may be provided with ribs 63 between the pressure controlled seal and an entrance of the product flow-through channel PFC, so that the cap rests on the ribs after breaking away from the ring, so that product can flow around and underneath the cap, as indicated by arrow a62. Alternatively, for example, the cap itself may be provided with ribs.

An airtight seal of the CPU at its upstream product entrance can be configured in various ways. FIG. 9 shows an alternative wherein the seal 61, 62 is further configured so that the sealing cap 62 (in particular a respective outer section 62*s*) can be radially compressed (upon pressurization from the product container) in order to release from the (fixed) ring portion 61, thereby opening a respective product flow path into the CPU. For example, a resilient or bendable neck portion 62*s* of the cap 62 can be pushed radially inwards, away from the opposite (fixed) ring 61, indicated by arrows a64, under the opening pressure exerted by contents of the product container when the container is pressurized (thereby reducing an outer diameter of the sealing cap 62 such that the cap can loosen or untighten from the surrounding retaining ring 61). In particular, as follows from FIG. 9, a circumferential outer side of the neck portion 62*s* of the cap 62 and an opposite inner side of the ring portion 61 can enclose a product pressure receiving slit 62*q*, allowing entry of pressurized product for radially compressing the sealing cap. Thus, pressure induced release of the cap 62 from the ring 61 is further facilitated.

In various embodiments, as is mentioned above, the system includes a pressurization chamber (for pressurizing a product holder). The pressurization chamber can be part of the machine B, or it can be part of a removable product container H. For example, as is mentioned above, the exterior walls TW, SW of the removable container H can act as a bag pressurization chamber. Alternatively, one or more such walls can be integrated in the machine B.

In each of these embodiments, the CPU (and its respective product holder, for example its flexible product bag FB) is preferably exchangeable. The CPU, during use, can extend e.g. partly or substantially outside the respective pressurization chamber (see e.g. FIG. 3A, 3B), through a CPU opening of the chamber (the product processing unit CPU in particular protruding via a wall structure SW of the container, e.g. via a dedicated CPU-receiving port RP, towards a product discharging area, as in FIG. 3B). In particular, the pressurization chamber can be defined by an external wall structure SW of the container, the wall structure SW including a CPU-receiving port RP for receiving and positioning the product processing unit CPU (see FIG. 12B).

The CPU is preferably configured to cooperate with the pressurization chamber (i.e. with its CPU-receiving port RP) to form an airtight seal there-between when the CPU is received in the CPU opening. Such a seal can be achieved in various ways. For example, a ring element 91 of the CPU may form an airtight seal with the CPU chamber and/or other sealing means (not shown) can be provided between and/or integrated in the CPU and the respective port RP for sealing contact or sealing engagement there-between. Thus, the pressurization chamber can be pressurized to a desired operating pressure, wherein a leakage of pressurization gas from the pressurized space can be prevented.

Preferably, in order to promote ease of use and to prevent faulty operation of the system, the system can be configured to provide feedback to a user regarding formation of the airtight seal between the CPU and the pressurization chamber, upon such formation. For example, the CPU may be configured to cooperate with the CPU receiving port RP to produce a sound and/or a haptic feedback signal, e.g. a click.

To facilitate accurate placement of a CPU through the CPU opening of the port RP (e.g. for lining up a fluid supply opening SV of the CPU to a fluid supply connector 50 of the dispensing machine, as shown in FIGS. 12A-B, an external shape 111 of the CPU may be configured to substantially mate with a shape 112 of the CPU receiving opening in the port RP. The respective shapes may thus cause alignment and/or centering of the CPU during placement in or through the CPU opening of the port RP. Preferably, as shown in FIGS. 12A-B, the respective shapes are rotationally asymmetric about an axis substantially corresponding to a direction of insertion of the CPU, which direction is indicated by arrow a110 in both figures, wherein the arrow points into the surface of the drawing in FIG. 12A. The rotational asymmetry may be provided in various ways, for example, as shown in FIGS. 12A-B, by one or more protrusions 113 of the CPU (in this case one) on the side of an otherwise substantially axially symmetric shape. The CPU-receiving port RP can have a mating shape (e.g. aperture, notch) 114 for receiving and engaging the protrusion 113 of the CPU. Such an asymmetry provides for resisting an incorrect insertion, particularly an insertion wherein the CPU is rotated with respect to a desired orientation about the said axis.

Preferably, to facilitate accurate placement including alignment and/or centering, the CPU and/or the CPU receiving port RP can have a tapered shape. For example, as shown in FIG. 12B, the shape of the CPU can be tapered from a wider part (top part in FIG. 12B) that is proximal to the pressurized space to a narrower part (bottom part in FIG. 12B) that is distal to the pressurized space. As a result, the CPU is automatically centered in the CPU receiving port during insertion, thus benefitting ease of operation as well as preventing inaccurate placement.

In an embodiment that is schematically shown in FIG. 13, which may be combined with any of the afore-described examples, a said cooling system CS can be configured to cool the interior of the container receiving space Hs, for cooling a product container including the CPU while it is received in that container receiving space Hs (the container not being shown in FIG. 13). The wall 121 structure of the receiving space Hs can e.g. include or be provided with one or more cooling duct/channel 122 of the cooling system CS, wherein—at least during operation—the cooling channel 122 contains a cooling liquid that is preferably circulated by the cooling system.

Each cooling channel 122 can be configured in various ways and can extend along various paths/directions. For example, one or more cooling channels 122 can extend in parallel with a center line of the container receiving space (as in FIG. 13). Preferably, in order to cool substantially the entire product container receiving space Hs, a said cooling channel 122 can extends along a winding and/or spiral/helical path around the container receiving space Hs.

The wall/wall structure 121 that encloses the container receiving space Hs may have a specific cooled CPU enclosing section (e.g. an extension) 125, which section 125 partly or substantially entirely encompasses outer sides of the CPU and optionally a respective nozzle NZ (in particular after placement of the container in the container receiving space; the CPU-enclosing section 125 is also schematically drawn by a dashed box in FIG. 3B, and another example of a CPU-enclosing section 125 is shown in FIG. 15).

Thus, the foamed product dispensing system may include a hermetically sealable wall structure 121 that encloses a container receiving space Hs for receiving the container H, wherein the wall structure 121 includes a product outlet port 136. The outlet port is preferably configured, e.g. insulated and/or cooled, e.g. directly and/or indirectly, to limit a temperature rise in the product at the outlet port.

Figure 4:
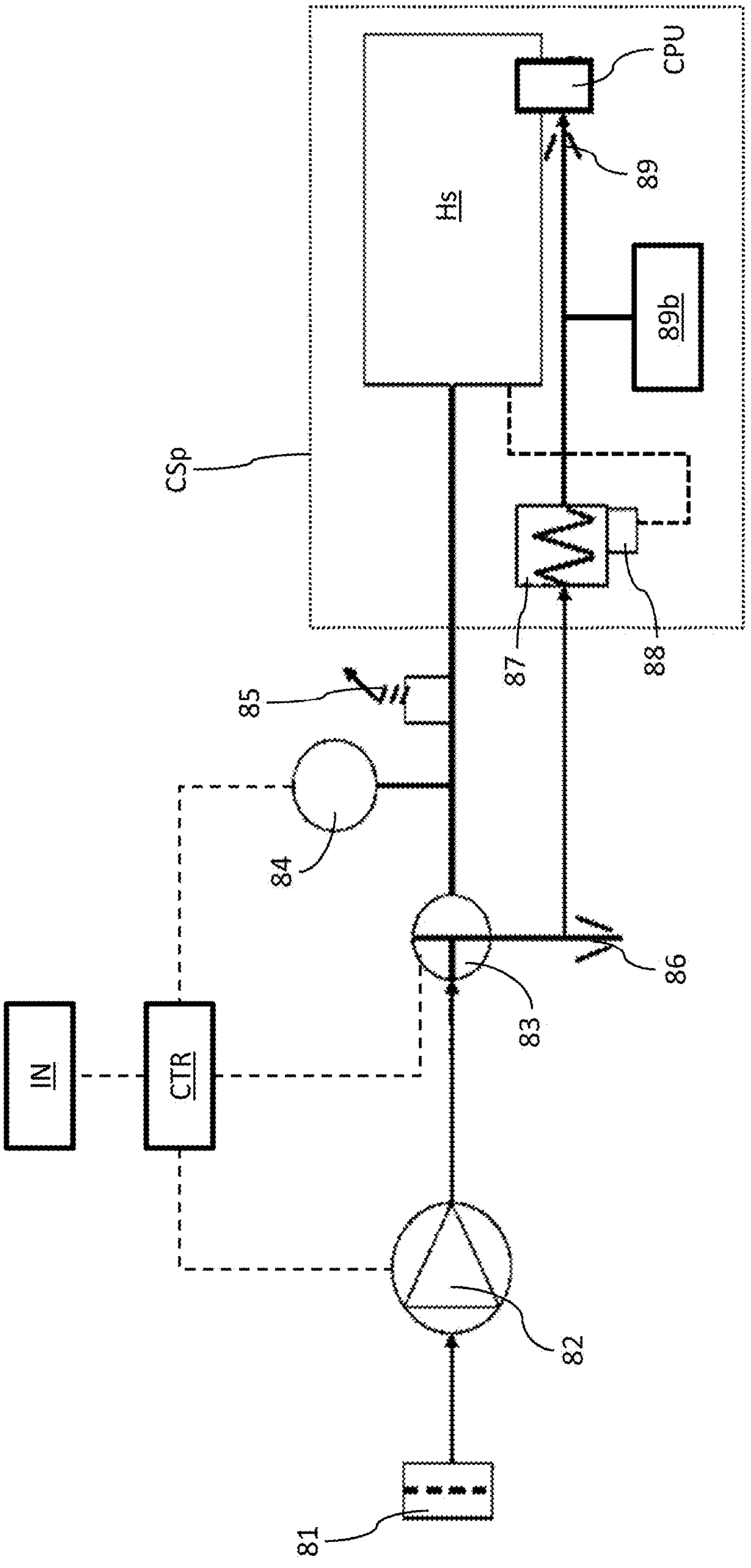
FIG. 4 shows a schematic view of a system for pressurization of a product container and for fluid supply to the CPU.

FIG. 4 shows a schematic view of a combined system for pressurization of a product container and for fluid supply to a CPU. This combined system relates to a preferred embodiment which may be carried out either independent of or in combination with any of the other embodiments. In alternative embodiments, for example, separate systems may be configured for pressurizing the product container and for fluid supply to the CPU.

In the exemplary system shown in FIG. 4, a choked gas supply is implemented, the choked gas supply including a respective flow constriction 89. In particular, as follows from the drawing, ambient air enters a compressor 82 through an air filter 81. A controllable three-way valve 83 directs the pressurized air downstream of the compressor either towards the container receiving space Hs, wherein the system is in a pressurization mode, or towards the CPU, wherein the system is in a dispensing mode. The three-way valve 83 is preferably adjustable by an electronic controller CTR between at least the pressurization mode and the dispensing mode. FIG. 4 schematically shows the three-way valve 83 in dispensing mode. In this exemplary embodiment, the pressurization mode and dispensing mode are mutually exclusive, although in alternative embodiments they may occur simultaneously.

In pressurization mode, a pressure sensor 84 measures the pressure in the container and feeds back a representative pressure signal to a controller (not shown) for regulating the pressure through regulation of the compressor 82. A safety valve 85 is provided to depressurize the container in case of excessive pressure, e.g. in case of a failure of the pressure sensor 84, the controller CTR and/or the compressor 82.

In dispensing mode, pressurized air enters a passive condensate block 87 which is positioned in a cooled space CSp of the dispensing system.

The condensate block 87 is configured to passively cool and dry the pressurized air and is provided with a drain valve 88 for draining condensate produced by cooling the air, wherein the drain valve 88 is configured to be closed in dispensing mode and open otherwise.

As indicated in FIG. 4, the drain valve 88 may be fluidly connected to the container receiving space Hs. In this way, air can drain from the product container Hs through the condensate block 87 through the drain valve 88 into the atmosphere.

Downstream of the condensate block 87, the pressurized air passes into the CPU through an orifice 89, wherein the orifice provides a flow constriction 89 (also called gas restriction) so that a so-called choked flow condition occurs when air is supplied at sufficiently high pressure upstream of the orifice. In such a choked flow condition, flow velocity of the gas inside the constriction substantially corresponds to a speed of sound in the gas in the constriction. Advantageously, as a result, air flow downstream of the orifice can be substantially flow controlled as opposed to pressure controlled. In particular, a substantially steady air flow through the microfiltration walls 15*a* of the CPU can be provided substantially irrespective of a level of clogging of those walls 15*a*, wherein clogging generally results in an increased flow resistance.

The flow constriction 89 is preferably arranged in one of: a (movable) fluid injector connector FIc of the product dispensing machine B, in particular in a distal part of the fluid injector FIc; and the product processing unit (CPU). Such an arrangement enables that the flow constriction 89 is arranged close to the microfiltration walls 15*a*, so that a delay in pressure build up at said walls 15*a* can be reduced, in particular by reducing the so-called dead volume between flow constriction 89 and walls 15*a*.

Upstream of the flow constriction 89, with further reference to FIG. 4, a gas buffer volume 89*b* can be provided in which a volume of pressurized gas, e.g. air, can be held. Such a buffer volume 89*b* can enable more rapid initial gas pressurization, in particular at the flow constriction 89, so that a delay in pressure build up at the microfiltration walls 15*a* can be further reduced (additional or alternative to a reduction as described above due to an arrangement of the flow constriction 89). It has been found that a minimum volume of the buffer volume 89*b* of 0.5 liter, e.g. a volume of up to 2 liter, can provide particularly good results.

The buffer volume 89*b* may for example be arranged in (e.g. formed by) a head space of the capsule SW or container receiving space Hs. Alternatively or additionally the buffer volume 89*b* may be arranged (elsewhere) in the machine B, in particular immediately downstream of the compressor 82, in order to limit or prevent shocks in the system.

Upstream of the condensate block 87 and downstream of the three-way valve 83, a bypass orifice 86 can be provided to evacuate excess air if the compressor is oversized.

The product dispensing machine B is preferably configured for pressurizing a placed product container H (e.g. placed in container receiving space Hs) to at least two (mutually different) operating pressures for supplying product to the processing unit CPU. In this way, user control of a cream-to-air ratio of the dispensed product can be provided, wherein in particular a higher operating pressure is associated with a higher cream-to-air ratio (i.e. a larger amount of cream with respect to an amount of air).

To that end, as shown in FIG. 4, the dispensing machine B preferably includes a user operable controller CTR for selecting a desired container operating pressure. In particular, said controller CTR may be connected to or forming part of a user interface IN of the machine B.

As shown, such a controller CTR may be combined with a controller which controls the compressor 82 and/or the three-way valve 83. Said controller CTR preferably receives input from the pressure sensor 84, for example to compare a sensed pressure to a predetermined or user configured target pressure.

The gas supply for supplying gas to the product (described above and shown in FIG. 4) is preferably configured for providing a predetermined gas flow rate during operation that is substantially independent of a set product container operating pressure.

FIGS. 17A, 17B depict an example, wherein the product container H' includes a CPU that is provided with a nozzle (or spout) NZ' that is movable between a first orientation (see FIG. 17A) and a second orientation (see FIG. 17B). The first orientation can e.g. be called an idle or 'parking' nozzle orientation.

The nozzle/spout NZ' can e.g. be swivably connected to a housing of the CPU'. Such a swivable connection can be achieved in various ways, e.g. via a flexible joint, a pivot link or hinge or the-like, as will be appreciated by the skilled person.

For example, the nozzle NZ' can have a relatively long nozzle stem extending towards the CPU, the stem being movable together with its nozzle. Alternatively, a flexible nozzle stem can be provided for providing nozzle movement.

For example, the first nozzle orientation (FIG. 17A) can be a storage and/or container loading orientation, for storing the container and/or loading the container into a container receiving space Hs, Hs' of a product dispensing machine B'. The first nozzle orientation can e.g. extend substantially in parallel with a said loading direction a71, a71' of the container (i.e. a nozzle center line nzc can extend along such a direction).

The second nozzle orientation (FIG. 17B) can e.g. be a product discharge orientation, for example providing a substantially vertical orientation (see FIGS. 15, 17B) when the container is positioned in the container receiving space Hs, Hs'. For example, the nozzle can be rotatable over an angle in the range of 1-180 degrees, more particular 1-90 degrees with respect to a remaining part of the CPU (e.g. a CPU housing), for providing the first and second nozzle orientations.

Referring to FIG. 16, a CPU having e.g. a slanted nozzle NZ' can e.g. include an undulating fluid path 7*u*', alternatingly comprising first 7*u*1' and second 7*u*2' path sections, downstream of the frothing device 15 (with may e.g. include two parallel microfiltration devices) but that is not required (e.g., as an alternative, a helical fluid path can be provided).

It is self-evident that the invention is not limited to the above-described exemplary embodiments. Various modifications are possible within the framework of the invention as set forth in the appended claims.

Thus, the product can comprise, for instance, an edible or non edible protein, a protein mixture or protein solution. An edible protein solution can comprise, for instance, a milk protein, a whey protein and casein, egg white proteins, yeast isolate, soy protein, hemoglobin, vegetal protein isolate, meat protein, collagen, gelatin and the like.

The product may be, for instance, homogeneously or non homogeneously foamed.

The product can be a food product, and/or a different type of product.

The product can further contain various substances, for instance, a thickener, coloring, flavoring and the like.

For example, alternative modes of valve operation may be employed, and fluid paths may be laid out along various spatial trajectories without substantially affecting the functional performance of the system.

Further, the product dispensing machine can be configured to pressurize the product container in various ways. In an example, the machine can include one or more pumps or pumping means for pressurizing the container. In addition or besides, the machine can be configured to include one or more dedicated high pressure reservoirs (e.g. one or more gas cylinders, being filled with gas at high pressure, e.g. a pressure higher than 100 bar), or to be connected to an external high pressure gas supply, for pressuring a product container.

Moreover, as is mentioned before, the product container as such can be configured in various ways. It may include e.g. a pressurization chamber but that is not required (for example, the dispensing machine B itself may include a pressurization chamber for receiving a product container). Also, is follows from the embodiments described, the product container may be partly or entirely removable from the dispensing machine, in particular to be exchanged with a new (part).

Moreover, in various embodiments, the frothing device 15 includes at least one microfiltration device, for supplying gas to the product (for foaming). In this way good foaming results can be achieved. However, the system (in particular the CPU) can additionally or alternatively include one or more other frothing elements to provide product foaming, for example one or more filter elements, one or more gas injector devices for injecting gas into the product, one or more stirring devices, one or more turbulence inducers for inducting turbulence in a product flow, a combination of one or such elements and/or in a different manner.

Further, as follows from the above, a replaceable product container H as such can be configured in various ways. It can be provided by a single container wall that encloses an interior space for holding the product. Also, it can be provided by an external (e.g. rigid) wall that encloses an interior space, for receiving an internal product holder (e.g. a flexible bag or a product holder having at least one flexible wall). The product container as such can be configured to be pressurized. Further, the product container can act as a removable capsule during operation, for positioning product (e.g. a product holder) in the dispensing machine B.

Moreover, in above-embodiments, the machine B itself includes a cooling system CS, in particular for cooling a container receiving space Hs. In a further or alternative embodiment, the product container itself (e.g. an aforementioned capsule SW) is provided with cooling means for cooling the container. As an example, an outer wall SW of the container can include one or more cooling ducts for circulating a cooling medium through that wall, wherein such cooling ducts can e.g. be fed by the cooling system of the machine B with the cooling medium during operation (via respective, interacting cooling medium ports). In another embodiment, the cooling system can be integrated with the replaceable container itself. In yet another embodiment, the container wall SW can include one or more Peltier elements for removing heat from the container, wherein a power supply for such elements can be integrated with the container and/or with the dispensing machine B (in the latter case, dedicated electric contacts between the machine B and the container SW can be implemented for transferring Peltier element cooling power from the machine B to the container).

Further, the CPU is preferably configured such that, before initial use, the interior of the CPU (in particular its interior product ducts and processing space/spaces as well as its interior gas ducts) are hermetically sealed off from an environment of the respective product container H, in an airtight manner. This can be achieved by the CPU construction and by application of gas tight sealing means that seal the product input/output openings as well as the gas injection opening before initial use. For example, a main outer wall structure of the CPU can be assembled from a number of different CPU sections, in particular a top section including the product inlet part and at least a further section including a gas injection part (the section e.g. being plastic CPU sections, made e.g. via plastic injection moulding and/or other manufacturing steps), wherein such CPU sections can be joined to each other in a manner to provide an hermetically sealed outer CPU surface (except for product input/discharge openings and the gas injection opening that can be sealed via dedicated sealing means, e.g. afterwards, as is described above).

Further, according to an aspect, the product container H does not necessarily need to be a loose (exchangeable) container. According to an embodiment, it can also be integrated in the machine/appliance.

Further, the product container H can be a disposable container.

Further, according to an embodiment, the container can be a bottle or bottle-type container.

For example, the exchangeable product container can be a bag in container (BIC), or a bag in box (BIB) or bottle in bottle container (BIB), as will be appreciated by the skilled person.

The invention claimed is:

1. A foamed product dispensing system, wherein the system comprises:

(a) a product dispensing machine, configured to receive an exchangeable product container;

(b) the exchangeable product container configured to contain a foamable product and to cooperate with the product dispensing machine, after placement in the machine, wherein the product container is provided with a product processing unit (CPU) comprising a frothing device having a product entrance for receiving product and a product exit for discharging product, wherein the CPU is connectable to a gas supply for supplying gas to the product, wherein the CPU comprises a processing device arranged downstream of the frothing device and is configured for performing a mixing treatment and/or pressure reduction treatment of the product provided with gas, wherein the processing device comprises an undulating fluid path for the product provided with gas, wherein the undulating fluid path alternatingly comprises first and second path sections, wherein the first path sections are substantially straight and extend substantially parallel to each other, wherein the second path sections each extend at an angle to a direction in which the first path sections extend, the angle being in the range of 45 to 135 degrees, wherein:

the undulating fluid path has a length of at least 30 cm; and/or the undulating fluid path has a substantially uniform transversal representative width in the range of 2.8 to 3.2 mm; and/or the first path sections have a total length that is at least two times larger than the total length of the second path sections.

2. The foamed product dispensing system according to claim 1, wherein the angle is in the range of 80 to 110 degrees.

3. The foamed product dispensing system according to claim 1, wherein the undulating path is a labyrinth type fluid path.

4. The foamed product dispensing system according to claim 1, wherein the undulating path is arranged around the frothing device.

5. The foamed product dispensing system according to claim 1, wherein the first path sections extend substantially in parallel with respect to the frothing device.

6. The foamed product dispensing system according to claim 1, having 10 to 30 first path sections.

7. The foamed product dispensing system according to claim 1, wherein the first path sections have a total length that is at least four times greater than the total length of the second path sections.

8. The foamed product dispensing system according to claim 1, wherein the processing device comprises a widening fluid path downstream of the undulating fluid path, the widening fluid path gradually increasing in width along its length in the downstream direction.

9. The foamed product dispensing system according to claim 1, wherein the system is configured to dispense foamed product having an overrun greater than 200%.

10. The foamed product dispensing system according to claim 9, wherein the overrun is greater than 300%.

11. The foamed product dispensing system according to claim 9, wherein the overrun is less than 800%.

12. The foamed product dispensing system according to claim 1, wherein the product dispensing machine is configured to cool the foamable product in the received product container.

13. The foamed product dispensing system according to claim 1, wherein the product dispensing machine comprises the gas supply, wherein the gas supply is configured to supply gas at an operational pressure in the range of 3 to 10 bar.

14. The foamed product dispensing system according to claim 13, wherein the gas supply is configured to supply gas at an operational pressure in the range of 4 to 8 bar.

15. The foamed product dispensing system according to claim 1, wherein the product container is configured to contain a volume of foamable product in the range of 0.5 to 10 L.

16. The foamed product dispensing system according to claim 1, wherein the CPU comprises a product feedthrough channel (PFC) upstream of the frothing device, wherein the PFC provides a flow restriction with a representative transversal area in the range of 1 to 3 $mm^2$.

17. The foamed product dispensing system according to claim 16, wherein the representative transversal area is in the range of 1.2 to 2.2 $mm^2$.

18. The foamed product dispensing system according to claim 1, wherein the frothing device is provided with one or more microfiltration walls having gas transmissive pores, wherein the one or more microfiltration walls separate a gas supply space associated with the gas supply from a foaming channel associated with the product entrance, wherein each of the microfiltration walls is substantially tubular, extending at a respective wall length along a respective main axis, wherein a sum of the respective wall lengths is in the range of 34 to 50 mm.

19. The foamed product dispensing system according to claim 15, having at least two microfiltration walls.

20. The system according to claim 19, wherein a difference in respective wall lengths of the at least two microfiltration walls is less than 2 mm.

21. A product container for a foamable product, comprising a product processing unit (CPU) with a frothing device having a product entrance for receiving product and a product exit for discharging product, wherein the CPU is connectable to a gas supply for supplying gas to the product, wherein the product processing unit CPU comprises a processing device arranged downstream of the frothing device and configured for performing a mixing treatment and/or pressure reduction treatment of the product provided with gas, wherein the processing device comprises an undulating fluid path for the product provided with gas, wherein the undulating fluid path alternatingly comprises first and second path sections, wherein the first path sections are substantially straight and extend substantially parallel to each other, wherein the second path sections each extend at an angle to a direction in which the first path sections extend, the angle being in the range of 45 to 135 degrees, wherein:

the undulating fluid path has a length of at least 30 cm,; and/or wherein the undulating fluid path has a substantially uniform transversal representative width in the range of 2.8 to 3.2 mm; and/or wherein the total length of the first path sections is at least two times larger than the total length of the second path sections.

* * * * *